(12) United States Patent
Saeki

(10) Patent No.: US 11,101,456 B2
(45) Date of Patent: Aug. 24, 2021

(54) SECONDARY BATTERY AND METHOD FOR MANUFACTURING SAME

(71) Applicant: KABUSHIKI KAISHA TOYOTA CHUO KENKYUSHO, Nagakute (JP)

(72) Inventor: Tooru Saeki, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 0 days.

(21) Appl. No.: 16/296,889

(22) Filed: Mar. 8, 2019

(65) Prior Publication Data

US 2019/0312256 A1 Oct. 10, 2019

(30) Foreign Application Priority Data

Apr. 4, 2018 (JP) .............................. JP2018-072695

(51) Int. Cl.
*H01M 4/75* (2006.01)
*H01M 4/583* (2010.01)
*H01M 4/66* (2006.01)
*H01M 4/62* (2006.01)
*H01M 4/133* (2010.01)
(Continued)

(52) U.S. Cl.
CPC .......... *H01M 4/131* (2013.01); *H01M 4/133* (2013.01); *H01M 4/485* (2013.01); *H01M 4/583* (2013.01); *H01M 4/621* (2013.01); *H01M 4/661* (2013.01); *H01M 4/75* (2013.01);
(Continued)

(58) Field of Classification Search
None
See application file for complete search history.

(56) References Cited

U.S. PATENT DOCUMENTS

| 4,659,637 A * | 4/1987 | Nelson .............. H01M 10/3909 429/104 |
| 2014/0212719 A1 | 7/2014 | Kwon et al. |

(Continued)

FOREIGN PATENT DOCUMENTS

| JP | 2001-043846 A | 2/2001 |
| JP | 2011-167714 A | 9/2011 |

(Continued)

OTHER PUBLICATIONS

JP-2011167714-A English machine translation (Year: 2011).*
Feb. 18, 2020 Japanese Office Action issued in Japanese Patent Application No. 2018-072695.

*Primary Examiner* — Lisa S Park
(74) *Attorney, Agent, or Firm* — Oliff PLC

(57) ABSTRACT

A secondary battery 10 includes a first electrode 11, a first current collection part 12, a second electrode 16, and a separation membrane 21. The first electrode 11 is a columnar body including a first active material. The first current collection part 12 is connected to the first electrode. The second electrode 16 includes a second active material. The separation membrane 21 has ionic conductivity and insulates the first electrode 11 from the second electrode 16. The secondary battery 10 has a structure in which a plurality of the first electrodes 11 are bundled together, with each of the first electrodes 11 being adjacent to the second electrode 16 with the separation membrane 21 disposed therebetween. The plurality of the first electrodes 11 is connected to the first current collection part 12 via a connection part 13 formed of a low-melting-point metal.

11 Claims, 15 Drawing Sheets

(51) Int. Cl.
*H01M 10/0525* (2010.01)
*H01M 10/04* (2006.01)
*H01M 2/16* (2006.01)
*H01M 4/131* (2010.01)
*H01M 4/485* (2010.01)
*H01M 50/409* (2021.01)

(52) U.S. Cl.
CPC ... *H01M 10/0422* (2013.01); *H01M 10/0525* (2013.01); *H01M 50/409* (2021.01); *H01M 2220/20* (2013.01)

(56) References Cited

U.S. PATENT DOCUMENTS

| | | | |
|---|---|---|---|
| 2015/0311503 A1* | 10/2015 | Ingale | H01M 4/244 320/130 |
| 2015/0333497 A1 | 11/2015 | Nomura et al. | |
| 2015/0364739 A1* | 12/2015 | Stacy | C04B 38/04 428/220 |
| 2016/0164064 A1 | 6/2016 | Lahiri et al. | |
| 2017/0077487 A1* | 3/2017 | Coakley | H05K 1/118 |

FOREIGN PATENT DOCUMENTS

| | | | |
|---|---|---|---|
| JP | 2011167714 A | * | 9/2011 |
| JP | 2014-532277 A | | 12/2014 |
| JP | 2015-079608 A | | 4/2015 |
| WO | 2014/034833 A1 | | 3/2014 |

\* cited by examiner

Heat Treatment Step

Separation Membrane Forming Step

Second Active Material Forming Step

Electrically Conductive Material Adding Step

Bundling Step

Plating Step

Low-melting-point Metal Forming Step

Connecting Step

Plating Step

Low-melting-point Metal Forming Step

Connecting Step

Fig. 12A
(a)
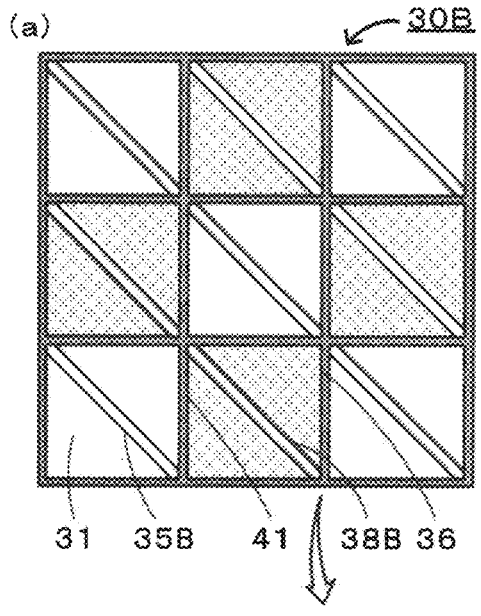
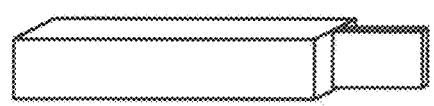
Fig. 12C
(c)
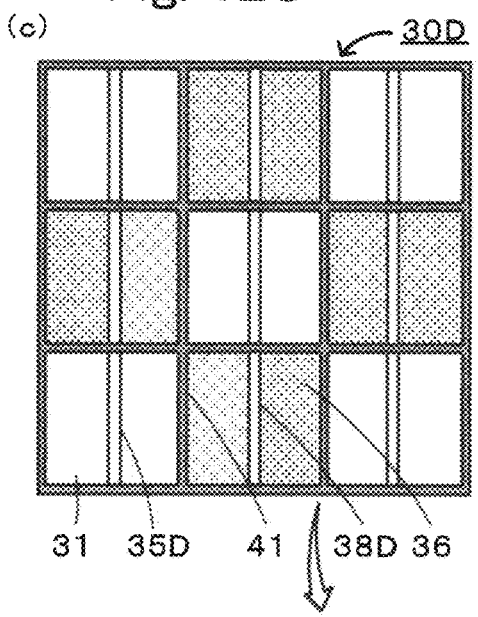
Fig. 12B
(b)
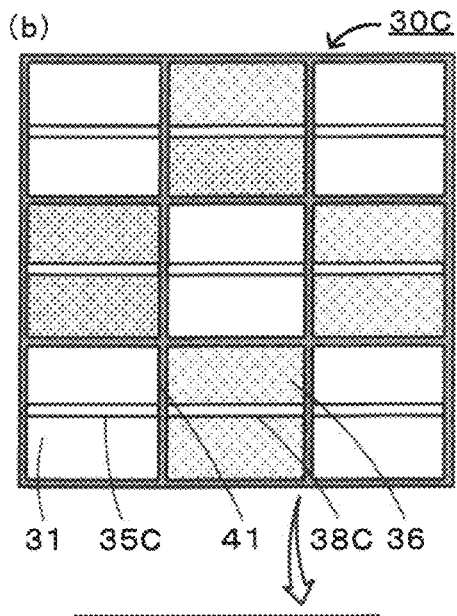
Fig. 12D
(d)
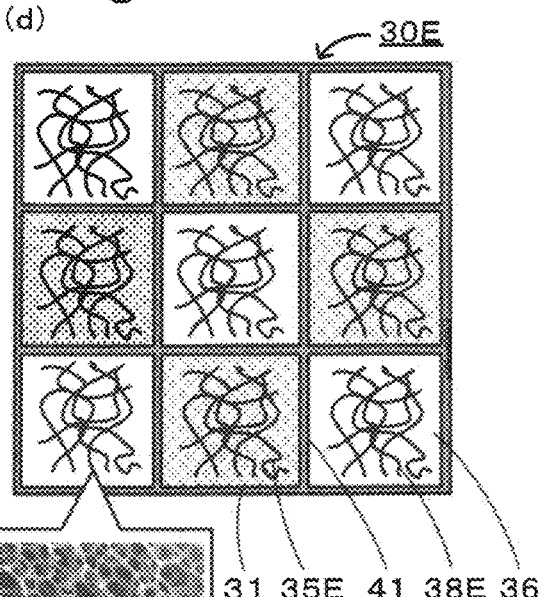
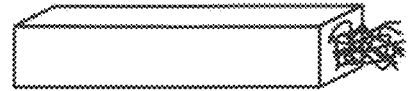

Fig. 14

| Structure: | 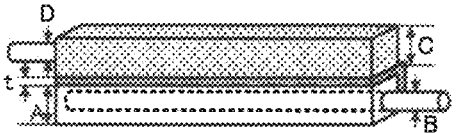 | | |
|---|---|---|---|
| | Example 2 | Example 3 | Example 4 |
| Positive Electrode: Side A (μm) | 100 | 150 | 200 |
| Current Collector Wire: Diameter B (μm) | 30 | 40 | 50 |
| Separation Membrane: Thickness t (μm) | 5 | 10 | 10 |
| Negative Electrode: Side C (μm) | 110 | 170 | 220 |
| Current Collector Wire: Diameter D (μm) | 30 | 35 | 50 |
| Volume Fraction of Positive and Negative Electrode Mixtures (%) | 85.5 | 85.1 | 87.3 |
| Positive and Negative Electrode Facing Area (cm$^2$) | 174 | 110.7 | 86.8 |
| Distance between Positive and Negative Electrodes (μm) (80 vol%) | 57 | 92 | 118 |
| Structure: | 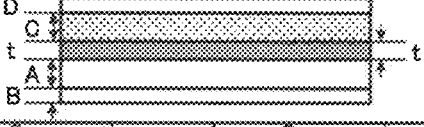 | | |
| | Comparative Example 1 | Comparative Example 2 | |
| Positive Electrode: Thickness A (μm) | 25 | 81 | |
| Current Collector Foil: Thickness B (μm) | 7.5 | 7.5 | |
| Separation Membrane: Thickness t (μm) | 20 | 12 | |
| Negative Electrode: Thickness C (μm) | 35 | 106 | |
| Current Collector Foil: Thickness D (μm) | 5 | 5 | |
| Volume Fraction of Positive and Negative Electrode Mixtures (%) | 64.9 | 88.4 | |
| Positive and Negative Electrode Facing Area (cm$^2$) | 108.1 | 47.3 | |
| Distance between Positive and Negative Electrodes (μm) (80 vol%) | 68 | 162 | |

Fig. 15

| Structure: | | | |
|---|---|---|---|
| | Example 5 | Example 6 | Reference Example 1 |
| Negative Electrode: Diameter A (μm) | 20 | 50 | 50 |
| Separation Membrane: Thickness t (μm) | 5 | 5 | 5 |
| Positive Electrode: Thickness X (μm) | 5.5 | 15 | 15 |
| Capacity Ratio between Positive and Negative Electrodes (mAh)/(mAh) | 1.0 | 1.0 | 1.0 |
| Capacity of Negative Electrode (mAh/g) | 350 | 350 | 400 |
| Capacity of Positive Electrode (mAh/g) | 190 | 190 | 250 |
| Energy Density of Electrode (Wh/L) | 815 | 1060 | 1345 |
| Cell Efficiency (%) | 80 | 80 | 80 |
| Positive and Negative Electrode Facing Area (cm²) | 580 | 300 | 320 |
| Energy Density of Cell (Wh/L) | 650 | 850 | 1075 |

| Structure: | | | |
|---|---|---|---|
| | Comparative Example 3 | Comparative Example 4 | Comparative Example 5 |
| Positive Electrode: Thickness A (μm) | 115 | 58 | 14 |
| Current Collector Foil: Thickness B (μm) | 6 | 6 | 6 |
| Separation Membrane: Thickness t (μm) | 5 | 5 | 5 |
| Negative Electrode: Thickness C (μm) | 160 | 80 | 20 |
| Current Collector Foil: Thickness D (μm) | 6 | 6 | 6 |
| Capacity Ratio between Positive and Negative Electrodes (mAh)/(mAh) | 1.2 | 1.2 | 1.2 |
| Capacity of Negative Electrode (mAh/g) | 350 | 350 | 350 |
| Capacity of Positive Electrode (mAh/g) | 190 | 190 | 190 |
| Energy Density of Electrode (Wh/L) | 914 | 865 | 645 |
| Cell Efficiency (%) | 70 | 70 | 70 |
| Positive and Negative Electrode Facing Area (cm²) | 35 | 65 | 200 |
| Energy Density of Cell (Wh/L) | 635 | 605 | 450 |

ENLARGE

ENLARGE

SECONDARY BATTERY AND METHOD FOR MANUFACTURING SAME

BACKGROUND OF THE INVENTION

1. Field of the Invention

The invention disclosed in this specification relates to a secondary battery and a method for manufacturing the same.

2. Description of the Related Art

A secondary battery of this type proposed in the related art is a cable-type secondary battery including a lithium ion supply core part including an electrolyte, an inner electrode formed to surround the outer surface of the core part, the inner electrode including a current collector having a three-dimensional network structure and coated with an inner electrode active material on its outer surface, and an outer electrode formed to surround the outer surface of the inner electrode and including an outer electrode active material layer (see Patent Literature 1, for example). In the secondary battery of Patent Literature 1, the electrolyte of the core part can easily permeate the active materials of the electrodes and therefore the battery has excellent capacity characteristics and cycle characteristics.

CITATION LIST

Patent Literature

PTL 1: JP 2014-532277 A

SUMMARY OF THE INVENTION

Incidentally, in recent years, in lithium secondary batteries, an increase in the capacity and an increase in the energy density per unit volume have been desired. For example, increasing the battery capacity of a secondary battery in which electrodes are layered requires increasing the thickness of the active material layers, but such an increase in the thickness of the films of the electrodes results in a long flow path for the electrolyte solution in the thickness direction, and as a result, the ion concentration gradient in the thickness direction cannot be easily mitigated. For the lithium ion secondary battery of Patent Literature 1 described above, no sufficient study was conducted on increasing the energy density.

In the past, the present inventors have found that the energy density can be increased further by employing a structure in which electrodes, each having a columnar shape, are bundled together and are connected to a current collection part. Further, in a secondary battery having such a structure, it has been desired that columnar electrodes be easily connected to a current collection part.

The present disclosure has been made in view of such challenges, and a main object of the present disclosure is to easily connect columnar electrodes to a current collection part, for a secondary battery including columnar electrodes and a current collection part.

To achieve the object described above, the present inventors have found that, when electrodes that are columnar bodies are connected to a current collection part with a low-melting-point metal, the columnar electrodes can be easily connected to the current collection part, and accordingly, have accomplished the invention disclosed in this specification.

That is, in the disclosure of this specification, a secondary battery includes:
a first electrode being a columnar body including a first active material;
a first current collection part connected to the first electrode;
a second electrode including a second active material;
and a separation membrane having ionic conductivity and insulating the first electrode from the second electrode.

The secondary battery has a structure in which a plurality of the first electrodes are bundled together, with each of the first electrodes being adjacent to the second electrode with the separation membrane disposed therebetween.

In the secondary battery, the plurality of the first electrodes is connected to the first current collection part via a connection part formed of a low-melting-point metal having a melting point of 327.5° C. or lower.

In the disclosure of this specification, a method for manufacturing a secondary battery includes:
a separation membrane forming step of forming, on a surface of a first electrode, a separation membrane having ionic conductivity and an insulating property, the first electrode being a columnar body including a first active material;
a bundling step of bundling together a plurality of the first electrodes, each of the first electrodes being adjacent to a second electrode with the formed separation membrane disposed therebetween, the second electrode including a second active material; and a connecting step of connecting the plurality of the first electrodes to a first current collection part with a low-melting-point metal having a melting point of 327.5° C. or lower.

In the secondary battery and the method for manufacturing the secondary battery, the columnar electrodes and the current collection part are connected to each other by using a low-melting-point metal, which has a low melting point, and therefore the columnar electrodes can be easily connected to the current collection part.

BRIEF DESCRIPTION OF THE DRAWINGS

FIGS. 12A to 12D present cross-sectional views of examples of secondary batteries 30B to 30E.

FIG. 14 is a chart illustrating, regarding columnar body bundled structures and electrode foil layered structures, the relationship between the volume fraction of the positive and negative electrode mixtures, the positive and negative electrode facing area, and the distance between positive and negative electrodes at 80 vol % of the electrodes.

FIG. 15 is a chart illustrating, regarding columnar body bundled structures and electrode foil layered structures, the relationship between the volume fraction of the positive and negative electrode mixtures, the positive and negative electrode facing area, and the energy density of the cell.

DETAILED DESCRIPTION OF THE INVENTION

Secondary batteries to be described in embodiments each includes a first electrode, which is a columnar body, a first current collection part, a connection part, a second electrode, and a separation membrane. In the secondary battery, the first electrode may be a positive electrode including a positive electrode active material, which is a first active material, and the second electrode may be a negative electrode including a negative electrode active material, which is a second active material. Alternatively, in the secondary battery, the first electrode may be a negative electrode including a negative electrode active material, and the second electrode may be a positive electrode including a positive electrode active material. Note that each of the electrodes may include an electrically conductive material and a binder in addition to the active material. The first electrode may be a columnar body, such as a cylindrical body or a prismatic body, and the second electrode may be a columnar body, such as a cylindrical body or a prismatic body. The columnar bodies of the first electrode and the second electrode may be solid bodies or may be honeycomb structures or foams. Furthermore, it may be sufficient that the first electrode have a columnar shape, and the second electrode may not have a columnar shape. Furthermore, the first electrode may include a current collection member embedded therein and the current collection member may be at least one of a current collector wire, a current collector foil, and a three-dimensional network structure, or the first electrode may be provided without a current collection member. The second electrode may include a current collection member embedded therein and the current collection member may be at least one of a current collector wire, a current collector foil, and a three-dimensional network structure, or the second electrode may be provided without a current collection member. Here, for convenience of description, the following description uses, as a main example, a lithium secondary battery in which the first electrode is a negative electrode, the second electrode is a positive electrode, and lithium ions are the carriers.

First Embodiment

Figure 1:
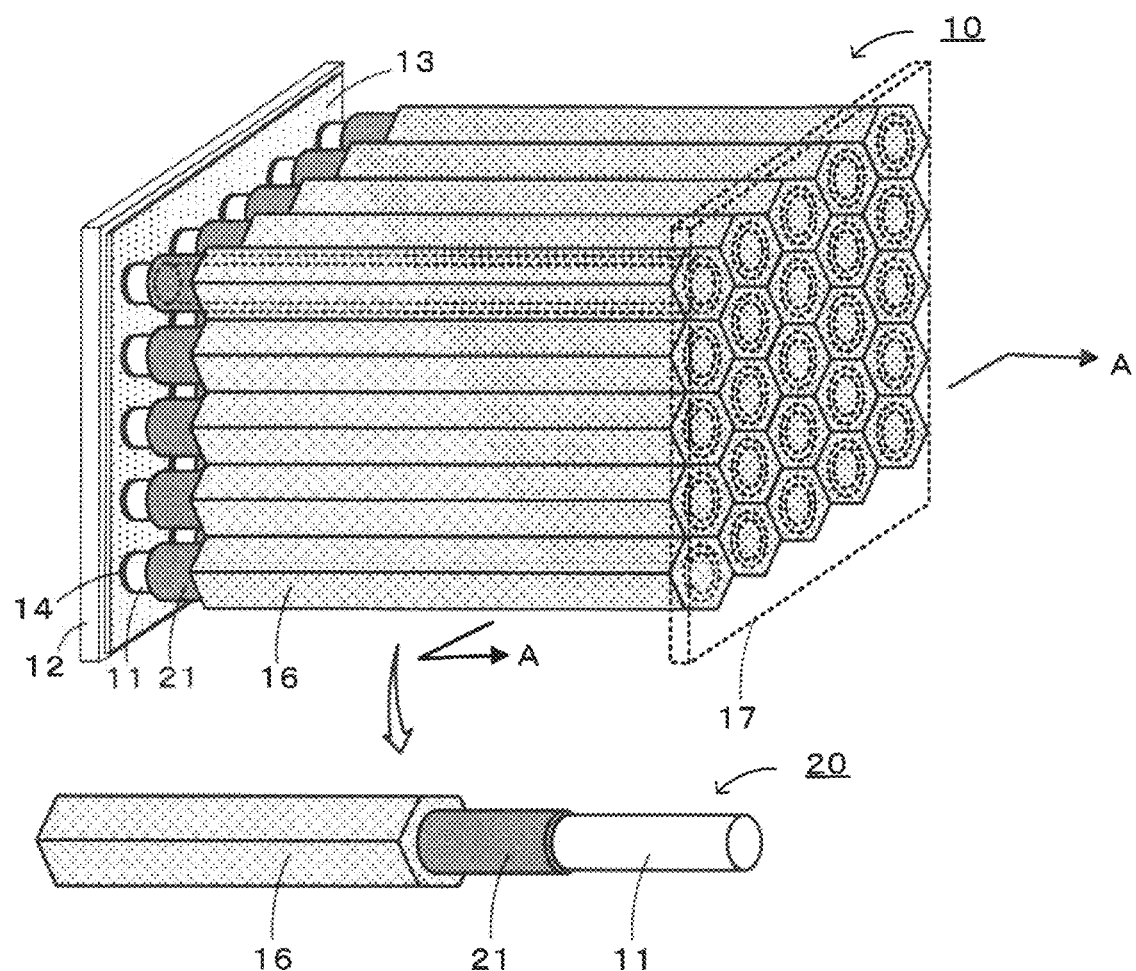
FIG. 1 is a schematic diagram illustrating an example of a secondary battery 10.
Figure 2:
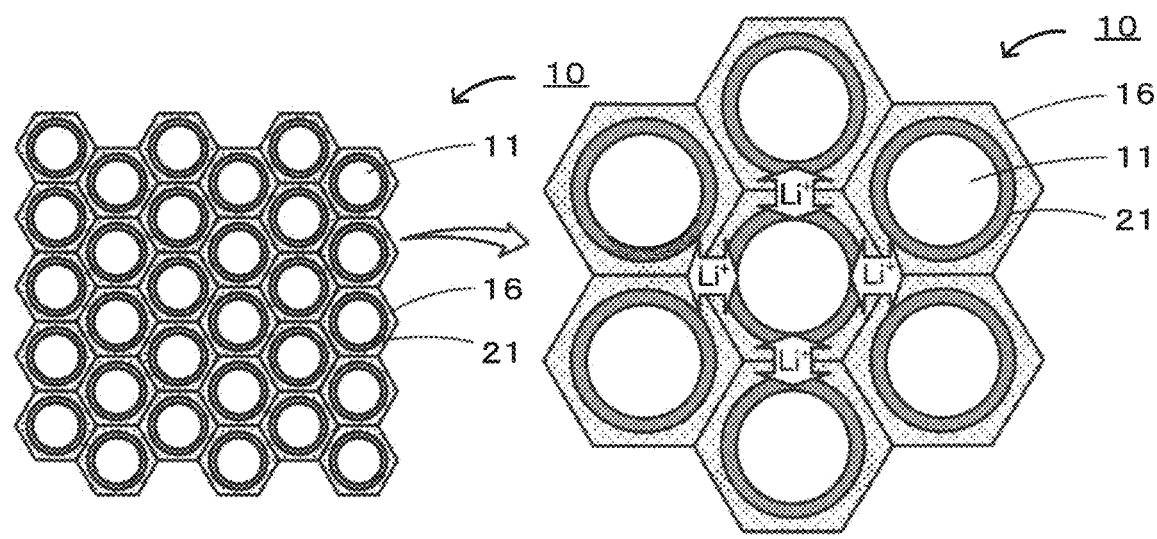
FIG. 2 is a cross-sectional view taken along line A-A of FIG. 1.

A secondary battery of the first embodiment will now be described with reference to the drawings. FIG. 1 is a schematic diagram illustrating an example of a secondary battery 10. FIG. 2 is a cross-sectional view of the secondary battery 10 of FIG. 1 taken along line A-A. As illustrated in FIGS. 1 and 2, the secondary battery 10 includes a first electrode 11, a first current collection part 12, a connection part 13, a plating layer 14, a second electrode 16, a second current collection part 17, and a separation membrane 12. The secondary battery 10 has a structure in which a plurality of (e.g., 50 or more) unit cells 20 are bundled together, in each of which the second electrode 16 is formed around the first electrode 11 with the separation membrane 21 disposed therebetween. The connection part 13, which is formed of a low-melting-point metal, is provided between the first electrode 11 and the first current collection part 12, and the first electrode 11 is connected to the first current collection part 12 via the connection part 13.

The first electrode 11 is a cylindrical body having a circular cross section and includes a first active material. The secondary battery 10 may have a structure in which 50 or more first electrodes 11 are bundled together. For example, the first electrode 11 may have a capacity of 1/n the cell capacity, and n first electrodes 11 may be connected in parallel to the first current collection part 12. The outer periphery of the first electrode 11, excluding the end faces, faces the second electrode 16 with the separation membrane 21 disposed therebetween. It is preferable that the first electrode 11 be a cylindrical body having a length (diameter) in the radial direction of 10 or greater and 200 μm or less in a cross section orthogonal to the longitudinal direction. The length may be 50 μm or greater and 100 μm or less. Within these ranges, the energy density per unit volume can be increased further. Further, within these ranges, the carrier ion migration distance can be reduced further, and charging and discharging can be carried out with a higher current. The length of the first electrode 11 in the longitudinal direction may be set appropriately in accordance with the application of the secondary battery, or the like, and may be, for example, within a range of 20 mm or greater and 200 mm or less, or the like. When the length in the longitudinal direction is not less than 20 mm, the battery capacity can be increased further, and therefore such a length is preferable, and when the length is not greater than 200 mm, the electrical resistance of the first electrode 11 can be reduced further, and therefore such a length is preferable. The first electrode 11 is electrically conductive itself.

For example, the first electrode 11 may be formed by molding the first active material, with which an electrically conductive material and a binder may be mixed as necessary. Examples of the first active material include materials that can occlude and release lithium, which is the carrier. Examples of the first active material include lithium metal, lithium alloys, inorganic compounds such as tin compounds, carbonaceous materials that can occlude and release lithium ions, complex oxides containing a plurality of elements, and electrically conductive polymers. Examples of the carbonaceous material include cokes, glassy carbons, graphites, non-graphitizable carbons, pyrolytic carbons, and carbon fibers. Of these, graphites such as artificial graphites and natural graphites are preferable. Furthermore, the carbonaceous material may be a carbon fiber having a graphite structure. In such carbon fibers, it is preferable that, for example, the crystal be oriented in the longitudinal direction, which is the fiber direction. Furthermore, it is preferable that the crystal be oriented radially from the center toward the outer peripheral surface as viewed in a cross section in a direction orthogonal to the longitudinal direction (fiber direction). Examples of the complex oxide include lithium titanium complex oxides and lithium vanadium complex oxides. The electrically conductive material is not particularly limited provided that the material is an electron conductive material that does not adversely affect the battery performance, and examples thereof include graphites such as natural graphites (scaly graphite and flaky graphite) and artificial graphites, acetylene blacks, carbon blacks, Ketjen blacks, carbon whiskers, needle cokes, carbon fibers, and metals (copper, nickel, aluminum, silver, gold, and the like). One or a mixture of two or more of these materials may be used. The binder serves to stabilize the particles of the first active material and the particles of the electrically conductive material to maintain a predetermined shape. Examples of the binder include fluorine-containing resins, such as polytetrafluoroethylene (PTFE), polyvinylidene fluoride (PVdF), and fluorocarbon rubbers, thermoplastic resins such as polypropylene and polyethylene, ethylene propylene diene monomer (EPDM) rubbers, sulfonated EPDM rubbers, and natural butyl rubbers (NBR). One or a mixture of two or more of these materials may be used. Furthermore, an aqueous binder may be used, examples of which include cellulose-based binders and aqueous dispersions of styrene butadiene rubber (SBR).

It is preferable that the content of the first active material in the first electrode 11 be high. The content is preferably not less than 70 vol % and more preferably not less than 80 vol %, relative to the total volume of the first electrode 11. The content of the electrically conductive material is preferably within a range of 0 vol % or greater and 20 vol % or less and more preferably within a range of 0 vol % or greater and 15 vol % or less, relative to the total volume of the electrode mixture containing the first active material. Within such ranges, a reduction in the battery capacity can be suppressed, and electrical conductivity can be sufficiently imparted. Furthermore, the content of the binder is preferably within a range of 0.1 vol % or greater and 5 vol % or less and more preferably within a range of 0.2 vol % or greater and 1 vol % or less, relative to the total volume of the first electrode 11.

The first electrode 11 may be one including the above-described carbonaceous material as the first active material or may be a columnar body formed of the carbonaceous material. Carbonaceous materials are electrically conductive themselves and are therefore preferable. The columnar body formed of a carbonaceous material may be one formed of a carbon fiber. It is preferable that the carbon fiber be a highly crystalline carbon fiber in which the graphene structure is oriented radially from the center toward the outer periphery and is also oriented in the fiber length direction. Such carbon fibers can occlude and release lithium ions, which are the carriers, through the outer periphery and therefore have high ionic conductivity and are preferable. Furthermore, the columnar body formed of a carbonaceous material may be a honeycomb structure or a foam, formed of a carbonaceous material.

The first current collection part 12 is an electrically conductive member and is electrically connected to the first electrode 11 via the connection part 13. Fifty or more first electrodes may be connected in parallel to the first current collection part 12 via the connection part 13. The first current collection part 12 may include, for example, carbon paper, aluminum, copper, titanium, stainless steel, nickel, iron, platinum, baked carbon, an electrically conductive polymer, electrically conductive glass, or the like or may include, for the purpose of improving adhesiveness, electrical conductivity and oxidation resistance (reduction properties), a material such as aluminum or copper surface-treated with carbon, nickel, titanium, silver, platinum, gold, or the like. The shape of the first current collection part 12 is not particularly limited provided that a plurality of first electrodes 11 can be connected thereto. For example, the first current collection part 12 may be in the form of a plate, a foil, a film, a sheet, a net, a rod, or a wire, may be a material formed by punching or expanding, or may be a lath, a porous body, a foam, a formed fiber body, or the like.

The connection part 13 is formed of a low-melting-point metal. The low-melting-point metal is a metal having a melting point not higher than the melting point of lead (327.5° C.) and may be an elemental metal or an alloy. The melting point of the low-melting-point metal is preferably not higher than the melting point of tin (232° C.), more preferably not higher than 180° C., and even more preferably not higher than 150° C. The lower limit of the melting point of the low-melting-point metal is not particularly limited and, for example, may be not lower than 60° C. or not lower than 70° C. If an internal short circuit occurs within a unit cell 20, the current is concentrated at a portion of the connection part 13 between the unit cell 20 and the first current collection part 12. Since the connection part 13 is formed of a low-melting-point metal, if an internal short circuit occurs, the connection part 13 is melted by Joule heat, thereby serving as a fuse mechanism that electrically disconnects the unit cell 20 experiencing the internal short circuit from the first current collection part 12. The lower the melting point of the connection part 13 is, the earlier the connection part 13 melts and the earlier the unit cell 20 experiencing the internal short circuit can be electrically disconnected from the entire cell, and therefore, the further the safety of the secondary battery 10 can be increased. The low-melting-point metal is not particularly limited provided that the low-melting-point metal is electrically conductive and may include one or more of tin, bismuth, and indium. It is preferable that the low-melting-point metal be free of lead and cadmium. Examples of the low-melting-point metal include solders, Wood's metals, Rose's metals, Newton's metals, Galinstan (registered trademark), and U-ALLOY (trade name, manufactured by Osaka Asahi Metal Mfg. Co., Ltd.). It is sufficient that the connection part 13 be formed such that the first electrode 11 can be connected to the first current collection part 12, but the connection part 13 is preferably formed between the end portion of the first electrode 11 and the first current collection part 12 and is more preferably formed between the end face of the first electrode 11 and the first current collection part 12 as illustrated in FIG. 1. Furthermore, the connection part 13 may be formed exclusively on portions, on the surface of the first current collection part 12, facing the first electrodes 11 or, as illustrated in FIG. 1, may also be formed on portions that do not face the first electrodes 11. The thickness of the connection part 13 is not particularly limited and may be, for example, 300 μm or greater and 500 μm or less. Within this range, the first electrode 11 can be connected to the first current collection part 12 more easily. Reducing the thickness of the connection part 13 accordingly reduces the electrical resistance of the connection part 13 and enables weight reduction of the battery and is therefore more preferable.

The plating layer 14 is formed on the surface of the first electrode 11 to be disposed between the connection part 13 and the first electrode 11. It is preferable that the plating layer 14 be formed on at least the end face of the first electrode 11. The plating layer 14 is not particularly limited provided that the plating layer 14 is electrically conductive. The plating layer 14 may include copper, nickel, zinc, gold, silver, platinum, or an alloy thereof. It is preferable that the material of the plating layer 14 be a material having good adhesion and wettability to the first electrode 11 or the connection part 13 and having low reactivity with the first electrode 11 or the connection part 13. The plating layer 14 may be a single layer or may include two or more layers. In the case where two or more layers are included, a plating layer adjacent to the first electrode 11 may be one that has good adhesion and wettability to the first electrode 11 and has low reactivity with the first electrode 11, and a plating layer adjacent to the connection part 13 may be one that has good adhesion and wettability to the connection part 13 and has low reactivity with the connection part 13. For example, a copper plating layer may be provided adjacent to the first electrode 11, and a nickel plating layer may be provided adjacent to the connection part 13. The plating layer 14 may include at least one of a copper plating layer and a nickel plating layer. A copper plating is preferable because a copper plating has good adhesion and wettability to various materials and has particularly good adhesion and wettability to materials that may be used in the first electrode 11, such as carbonaceous materials. Furthermore, a nickel plating is preferable because a nickel plating has relatively good adhesion and wettability to various materials and has particularly low reactivity with materials that may be used in the connection part, for example, a low-melting-point metal including one or more of tin, bismuth, and indium.

The second electrode 16 includes a second active material and is formed around the outer periphery of the first electrode 11 with the separation membrane 21 disposed therebetween. The second electrode 16 has a hexagonal exterior shape in a cross section and includes therein the cylindrical first electrode 11. Note that it is sufficient that the second electrode 16 be filled into the space between first electrodes 11, and therefore, the exterior shape is not particularly limited to a hexagonal shape. The second electrode 16 is electrically conductive itself, and an end face of the second electrode 16 is connected to the second current collection part 17. The second electrode 16 may be directly connected to the second current collection part 17 or may be connected thereto via a connection part and/or a plating layer, as with the first electrode 11. For example, the second electrode 16 may be formed by forming the separation membrane 21 on the outer periphery of the first electrode 11 and then coating the outer periphery of the separation membrane 21 with a material for the second electrode 16.

For example, the second electrode 16 may be formed by molding the second active material, with which an electrically conductive material and a binder may be mixed as necessary. Examples of the second active material include materials that can occlude and release lithium, which is the carrier. The second active material may be, for example, a compound containing lithium and a transition metal. Examples of such a compound include an oxide containing lithium and a transition metal element and a phosphoric acid compound containing lithium and a transition metal element. Specifically, any of the following may be used: a lithium manganese complex oxide having a general composition formula $Li_{(1-x)}MnO_2$ (e.g., $0<x<1$, the same applies hereinafter), $Li_{(1-x)}Mn_2O_4$, or the like; a lithium cobalt complex oxide having a general composition formula $Li_{(1-x)}CoO_2$ or the like; a lithium nickel complex oxide having a general composition formula $Li_{(1-x)}NiO_2$ or the like; a lithium cobalt nickel manganese complex oxide having a general composition formula $Li_{(1-x)}Co_aNi_bMn_cO_2$ ($a>0$, $b>0$, $c>0$, $a+b+c=1$) or the like; a lithium vanadium complex oxide having a general composition formula $LiV_2O_3$ or the like; a transition metal oxide having a general composition formula $V_2O_3$ or the like; and the like. Furthermore, a lithium iron phosphate compound having a general composition formula $LiFePO_4$, or the like, may be used as the positive electrode active material. Of these, lithium cobalt nickel manganese complex oxides, for example, $LiCo_{1/3}Ni_{1/3}Mn_{1/3}O_2$, $LiNi_{0.4}CO_{0.3}Mn_{0.3}O_2$, and the like are preferable. Note that the term "general composition formula" is used to indicate that one or more other elements, for example, components such as Al and Mg, may be included. With regard to an electrically conductive material and a binder, those described by way of example for the first electrode 11 may be appropriately used, for example.

It is preferable that the content of the second active material in the second electrode 16 be high. The content is preferably not less than 70 vol % and more preferably not less than 80 vol %, relative to the total volume of the second electrode 16. The content of the electrically conductive material is preferably within a range of 0 vol % or greater and 20 vol % or less and more preferably within a range of 0 vol % or greater and 15 vol % or less, relative to the total volume of the second electrode 16. Within such ranges, a reduction in the battery capacity can be suppressed, and electrical conductivity can be sufficiently imparted. Furthermore, the content of the binder is preferably within a range of 0.1 vol % or greater and 5 vol % or less and more preferably within a range of 0.2 vol % or greater and 1 vol % or less, relative to the total volume of the second electrode 16.

The second current collection part 17 is an electrically conductive member and is electrically connected to the second electrode 16. Fifty or more second electrodes 16 may be connected in parallel to the second current collection part 17. The second current collection part 17 may be a member similar to the first current collection part 12.

The separation membrane 21 has an ionic conductivity for carrier ions (e.g., lithium ions) and insulates the first electrode 11 from the second electrode 16. The separation membrane 21 is formed on the entirety of the outer peripheral surface of the first electrode 11, which faces the second electrode 16, and prevents short circuiting between the first electrode 11 and the second electrode 16. Suitably, the separation membrane 21 includes a polymer having ionic conductivity and insulating properties. Examples of the separation membrane 21 include a copolymer of polyvinylidene fluoride (PVdF) and hexafluoropropylene (HFP), polymethyl methacrylate (PMMA), and a copolymer of PMMA and an acrylic polymer. For example, with a copolymer of PVdF and HFP, a portion of the electrolyte solution causes the membrane to become a swollen gel to form an ion-conducting membrane. For example, a thickness t of the separation membrane 21 is preferably not less than 0.5 µm and more preferably not less than 2 µm and may be not less than 5 µm. A thickness t of not less than 0.5 µm is preferred for the purpose of ensuring insulating properties. Furthermore, the thickness t of the separation membrane 21 is preferably not greater than 20 µm and more preferably not greater than 10 µm. A thickness t of not greater than 20 µm makes it possible to suppress a reduction in ionic conductivity and is therefore preferable. When the thickness t is within a range of 0.5 to 20 µm, ionic conductivity and insulating properties are suitable. The separation membrane 21 may be formed, for example, by immersing the first electrode 11 or the second electrode 16 in a solution containing the material to coat the surface.

The separation membrane 21 may include an ion-conducting medium for conducting carrier ions. The ion-conducting medium may be, for example, an electrolyte solution in which a supporting electrolyte is dissolved in a solvent, or the like. The solvent for the electrolyte solution may be, for example, a solvent for a non-aqueous electrolyte solution. Examples of the solvent include carbonates, esters, ethers, nitriles, furans, sulfolanes, and dioxolanes. One of these or a mixture of any of these may be used. Specific examples include: carbonates, examples of which include cyclic carbonates, such as ethylene carbonate (EC), propylene carbonate, vinylene carbonate, butylene carbonate, and chloroethylene carbonate, and chain carbonates, such as dimethyl carbonate (DMC), ethyl methyl carbonate (EMC), diethyl carbonate, ethyl-n-butyl carbonate, methyl-t-butyl carbonate, di-i-propyl carbonate, and t-butyl-i-propyl carbonate; cyclic esters, such as γ-butyl lactone and γ-valerolactone; chain esters, such as methyl formate, methyl acetate, ethyl acetate, and methyl butyrate; ethers, such as dimethoxyethane, ethoxymethoxyethane, and diethoxyethane; nitriles, such as acetonitrile and benzonitrile; furans, such as tetrahydrofuran and methyltetrahydrofuran; sulfolanes, such as sulfolane and tetramethyl sulfolane; and dioxolanes, such as 1,3-dioxolane and methyl dioxolane. For example, the supporting electrolyte includes ions that are the carriers of the secondary battery 10. Examples of the supporting electrolyte include $LiPF_6$, $LiBF_4$, $LiAsF_6$, $LiCF_3SO_3$, $LiN(CF_3SO_2)_2$, $LiC(CF_3SO_2)_3$, $LiSbF_6$, $LiSiF_6$, $LiAlF_4$, LiSCN, $LiClO_4$, LiCl, LiF, LiBr, LiI, and $LiAlCl_4$. Of these, one salt or a combination of two or more salts selected from the group consisting of inorganic salts such as $LiPF_6$, $LiBF_4$, and $LiClO_4$ and organic salts such as $LiCF_3SO_3$, $LiN(CF_3SO_2)_2$, and $LiC(CF_3SO_2)_3$ is preferable from the standpoint of electrical properties. The concentration of the supporting electrolyte in the electrolyte solution is preferably 0.1 mol/L or greater and 5 mol/L or less and more preferably 0.5 mol/L or greater and 2 mol/L or less.

In the secondary battery 10, since the columnar first electrode 11 and the first current collection part 12 are connected to each other by fusion bonding with a low-melting-point metal, which has a low melting point, a plurality of the first electrodes 11 can be easily connected to the first current collection part 12. For example, connection can be accomplished at low temperature, with a low force, and with a simpler configuration. Furthermore, compared with the case in which the first electrode 11 is simply in contact with the first current collection part 12, contact resistance is reduced, current can be collected more reliably, and the current collection status can be maintained to be stable. Furthermore, since the connection part 13 is formed of a low-melting-point metal, if an internal short circuit occurs, the portion of the connection part 13 between the first current collection part 12 and the portion of the first electrode 11 included in the path of the internal short circuit melts to serve as a fuse mechanism, thereby further increasing the safety of the lithium secondary battery. Furthermore, since the end face of the columnar electrode is fusion-bonded to the current collection part to carry out current collection, the volume occupied by the electrodes themselves in the secondary battery as a whole can be further increased, thereby further increasing the energy density.

Furthermore, in the secondary battery 10, since the plating layer 14 is formed between the first electrode 11 and the connection part 13, electrical connection between the first electrode 11 and the connection part 13 is further improved because, for example, adhesion between the first electrode 11 and the connection part 13 is further enhanced.

Furthermore, as illustrated in FIGS. 1 and 2, the secondary battery 10 has a structure in which cylindrical first electrodes 11 are bundled together, and the second electrode 16 is formed of an active material layer, which includes the second active material and is formed around the first electrode 11. In the secondary battery 10, the electrode is configured to have a minute columnar shape, and as such, each of the electrodes can occlude and release carrier ions through the entire periphery (see FIG. 2). In this electrode structure, carrier ions are occluded and released through the entire peripheries, and as a result, in addition to promotion of the reaction due to the increase in the positive and negative electrode facing area, the effect of improving the average reaction rate (reducing the average distance between positive and negative electrode active materials) as a result of the fact that the amount of an active material per facing area decreases as the location becomes deeper (inward location) (the ease of reaction decreases as the location of the active material becomes deeper) can be expected.

In addition, the secondary battery 10 is a secondary battery having a further increased energy density. It is believed that the reason that such an effect is produced is as follows. For example, in the case of the related art electrode structure in which an active material is formed on a metal foil current collector and such layers are stacked with a separator disposed therebetween, increasing the energy density requires increasing the coating weight and/or the density of the electrode mixture on the current collector foil, which results in problems, such as a decrease in ionic conductivity. In contrast, the secondary battery of the present disclosure employs the structure in which columnar body electrodes are bundled together, and as a result, the ion transport distance is further reduced. Furthermore, in the secondary battery of the present disclosure, the separator or the like is replaced by the separation membrane and is thus made thinner, for example, and therefore, the occupancy of the active materials in the space is further increased. As a result, the energy density is further increased.

(Manufacturing method)

Figure 3A:
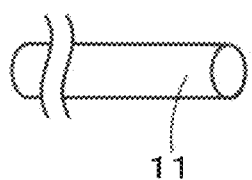
FIGS. 3A to 3H are illustrative diagrams illustrating an example of a process of manufacturing a secondary battery 10.
Figure 3B:
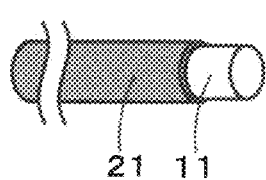
Figure 3C:
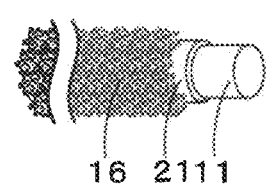
Figure 3D:
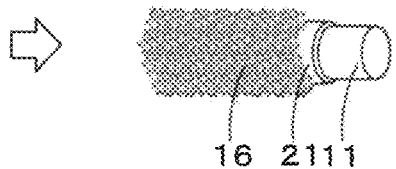
Figure 3E:
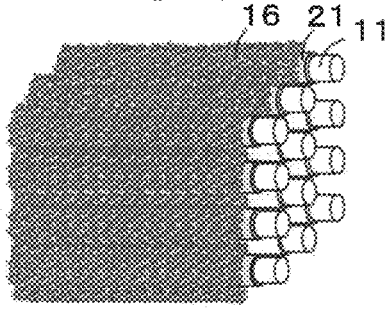
Figure 3F:
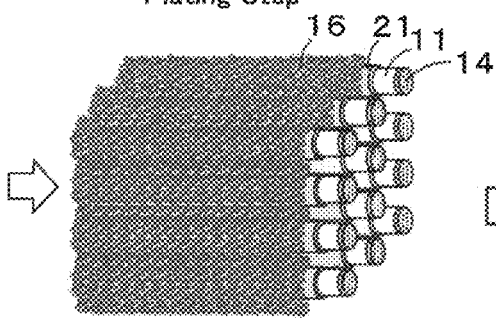
Figure 3G:
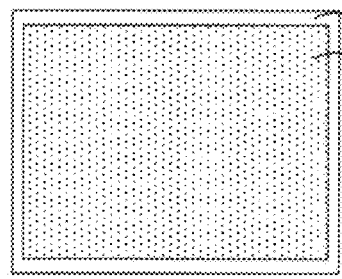
Figure 3H:
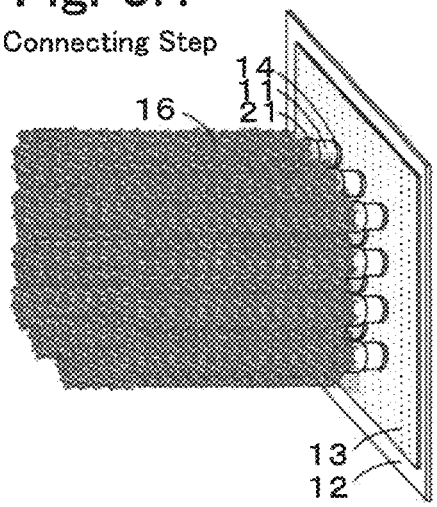

A method for manufacturing the secondary battery will now be described. The manufacturing method includes a separation membrane forming step, a bundling step, and a connecting step. Here, a process of manufacturing the secondary battery 10 will be described as a specific example. FIG. 3 are illustrative diagrams illustrating an example of a process of manufacturing the secondary battery 10. FIG. 3A illustrates a heat treatment step, FIG. 3B illustrates a separation membrane forming step, FIG. 3C illustrates a second active material forming step, FIG. 3D illustrates an electrically conductive material adding step, FIG. 3E illustrates a bundling step, FIG. 3F illustrates a plating step, FIG. 3G illustrates a low-melting-point metal forming step, and FIG. 3H illustrates a connecting step. Each of the steps will be described below.

In the heat treatment step, a raw material of a carbon material is subjected to a heat treatment to prepare a carbon fiber (first electrode 11) (FIG. 3A). In this step, the heat treatment may be performed after the raw material of the carbon fiber is spun into fibers. Examples of the raw material of the carbon fiber include amorphous carbon and graphitizable carbon. The heat treatment may be performed in an inert atmosphere at a temperature within a range of 800° C. or higher and 1200° C. or lower. It is preferable that the heat treatment be performed at a temperature within a range of 900° C. or higher and 1100° C. or lower. The inert atmosphere may be, for example, an atmosphere of nitrogen gas or noble gas. Of these, an argon atmosphere is preferable.

In the separation membrane forming step, the separation membrane 21, which has ionic conductivity and insulating properties, is formed on the surface of the first electrode 11, which is a columnar body including a first active material (FIG. 3B). This step may be carried out by coating the material of the separation membrane 21 described above and drying the coating or by immersing the first electrode 11 in a solution of the material of the separation membrane 21. The separation membrane forming step may include a step of forming the separation membrane 21 having insulating properties and a step of imparting ionic conductivity to the separation membrane 21 by, for example, causing the separation membrane 21 to swell with an ion-conducting medium. These steps may or may not be continuously performed.

In the second active material forming step, the second electrode 16 including the second active material is formed on the separation membrane 21 (FIG. 3C). For example, the second active material may include an electrically conductive material and a binder adhered to the active material fine particles. In this step, a second electrode mixture in a slurry form containing particles of the second active material may be prepared, and the mixture may be coated onto the separation membrane 21.

In the electrically conductive material adding step, a process of adding an electrically conductive material to the second active material is performed as necessary (FIG. 3D). Examples of the electrically conductive material include carbon materials and particles of metals (e.g., Cu, Ni, Al, and the like).

In the bundling step, columnar bodies of a plurality of the first electrodes 11 prepared as described above are arranged, each of the first electrodes 11 being adjacent to the second electrode 16 with the separation membrane 21 disposed therebetween, and the plurality of first electrodes 11 are bundled together (FIG. 3E). In the bundling step, pressure may be applied to the bundle body.

In the plating step, a plating is applied to the end portion of the first electrode 11 (FIG. 3F). The method of plating is not particularly limited, and electrolytic plating, electroless plating, hot dip plating, vapor plating (vacuum vapor deposition, CVD, PVD, or the like), or the like may be used. Electrolytic plating and electroless plating, which are relatively easy, are more preferable.

In the low-melting-point metal forming step, a low-melting-point-metal layer (connection part 13) is formed on the surface of the first current collection part 12 (FIG. 3G). In this step, a low-melting-point metal may be heated and melted and then dripped or coated onto the surface of the first current collection part 12. In this manner, a low-melting-point-metal layer can be formed relatively easily.

In the connecting step, the first electrode 11 including the plating layer 14 provided thereon and the first current collection part 12 including the low-melting-point-metal layer provided thereon are brought into contact with each other in a state in which the low-melting-point-metal layer is melted, and in this state, the low-melting-point-metal layer is solidified, thereby connecting the first electrode 11 to the first current collection part 12 with the connection part 13 (FIG. 3H). In this step, the first electrode 11 and the first current collection part 12 may be brought into contact with each other before the low-melting-point-metal layer formed in the low-melting-point metal forming step solidifies, or the first electrode 11 and the first current collection part 12 may be brought into contact with each other after the low-melting-point-metal layer formed on the first current collection part 12 is heated and melted or while the low-melting-point-metal layer is heated and melted. In this manner, the secondary battery 10 can be prepared.

Second Embodiment

Figure 4:
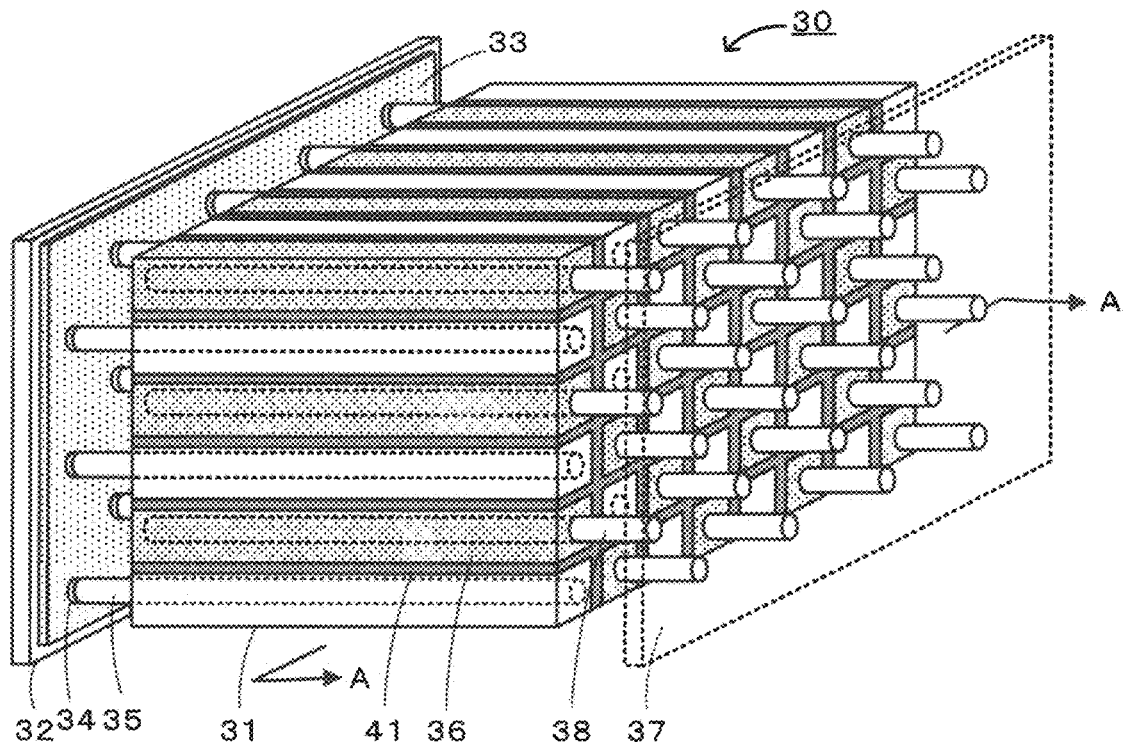
FIG. 4 is a schematic diagram illustrating an example of a secondary battery 30.
Figure 5:
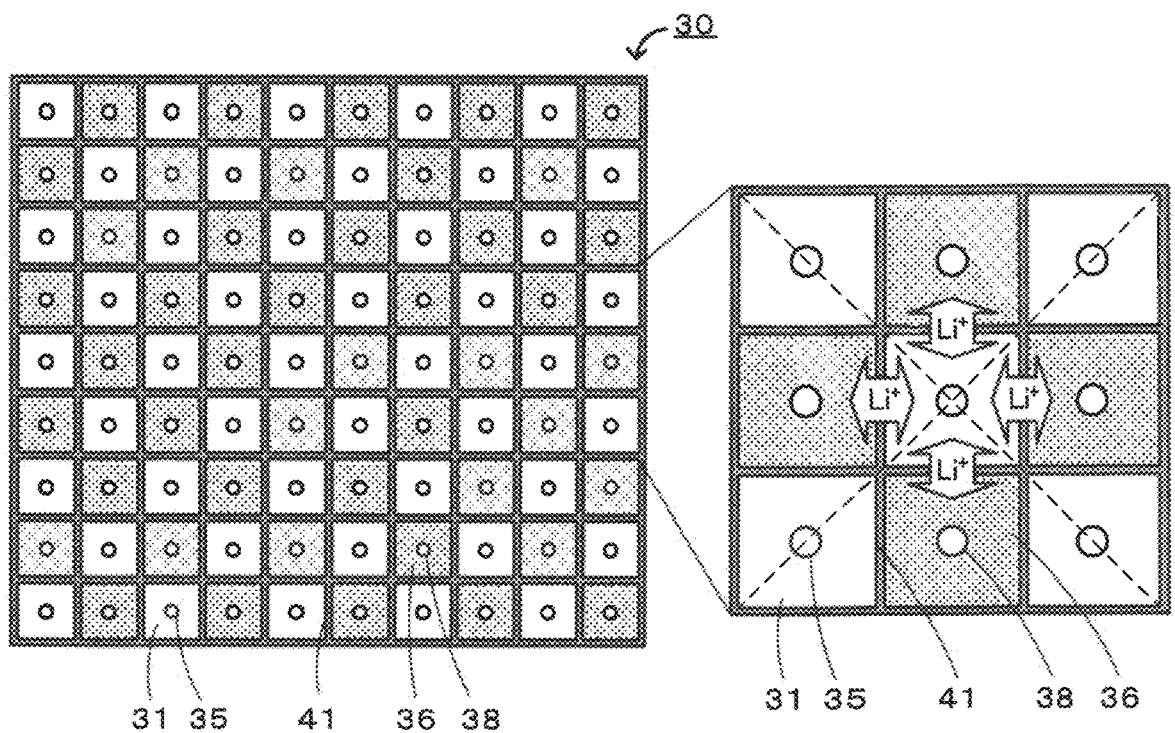
FIG. 5 is a cross-sectional view taken along line A-A of FIG. 4.
Figure 6:
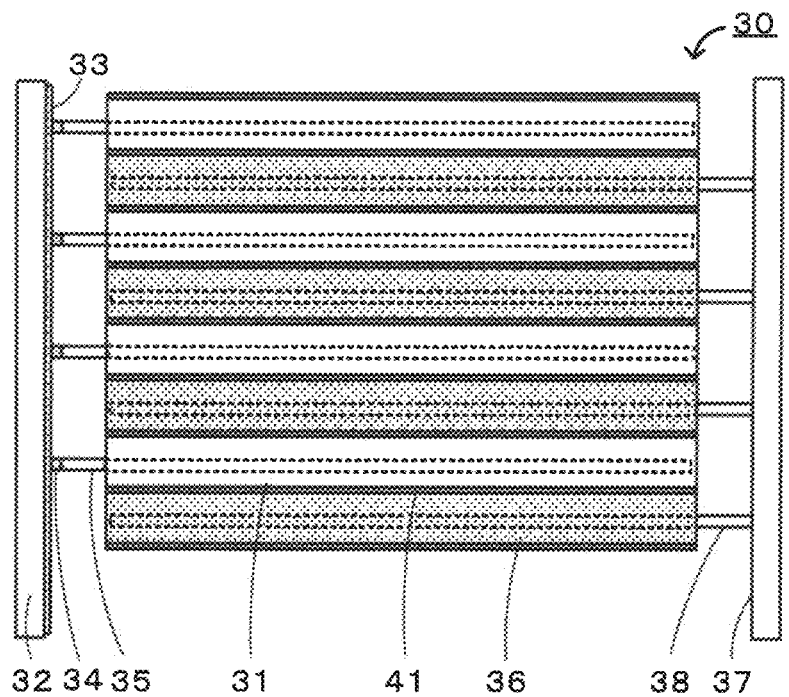
FIG. 6 is a plan view of the secondary battery 30.

A secondary battery of the second embodiment will now be described with reference to the drawings. FIG. 4 is a schematic diagram illustrating an example of a secondary battery 30. FIG. 5 is a cross-sectional view of the secondary battery 30 of FIG. 4 taken along line A-A. FIG. 6 is a plan view of the secondary battery 30. As illustrated in FIGS. 4 to 6, the secondary battery 30 includes a first electrode 31, a first current collection part 32, a connection part 33, a plating layer 34, a second electrode 36, a second current collection part 37, and a separation membrane 41. In the secondary battery 30, the second electrode 36 is a columnar body including a second active material. The secondary battery 30 has a structure in which first electrodes 31 and second electrodes 36 are alternately arranged and bundled together. Note that, in the secondary battery 30, the material included in each of the constituent elements, and the like, are similar to those for the secondary battery 10, and therefore descriptions thereof are omitted.

The first electrode 31 is a columnar body including a first active material. The first electrode 31 is a quadrilateral prism having a rectangular cross section. The secondary battery 30 may have a structure in which 50 or more first electrodes 31 are bundled together. For example, the first electrode 31 may have a capacity of 1/n the cell capacity, and n first electrodes 31 may be connected in parallel to the first current collection part 32. It is preferable that the first electrode 31 be a columnar body having a length of a side of 100 µm or greater and 300 µm or less in a cross section orthogonal to the longitudinal direction. Within this range, the energy density per unit volume can be increased further. Further, within this range, the carrier ion migration distance can be reduced further, and charging and discharging can be performed with a higher current.

The first electrode 31 includes a current collector wire 35, which has a circular cross section and is embedded within the first electrode 31. It is preferable that the current collector wire 35 be formed of an electrically conductive material such as a metal, examples of which include aluminum, copper, titanium, stainless steel, nickel, iron, and platinum. The current collector wire 35 extends beyond the first electrode 31, out of the interior, and therefore the end portions are exposed. For example, the length (thickness) of the current collector wire 35 in the radial direction is preferably not greater than 50 µm, more preferably not greater than 40 µm, and even more preferably not greater than 30 µm. It is preferable that the current collector wire 35 be as thin as possible provided that electrical conductivity is ensured. The reason is that the energy density per unit volume can be further improved. For example, the length of the current collector wire 35 in the radial direction is preferably not less than 1 µm, more preferably not less than 5 µm, and even more preferably not less than 10 From the standpoint of ensuring electrical conductivity, it is preferable that the current collector wire 35 be thick.

The connection part 33 is formed of a low-melting-point metal. It is sufficient that the connection part 33 be formed such that the first electrode 31 can be connected to the first current collection part 32, and, for example, as illustrated in FIG. 4, the connection part 33 may be formed adjacent to an end portion of the current collector wire 35, which extends beyond the first electrode 31 and is exposed.

The plating layer 34 is formed on the surface of the current collector wire 35, which extends beyond the first electrode 31, to be disposed between the connection part 33 and the current collector wire 35. It is preferable that the material of the plating layer 34 be a material having good adhesion and wettability to the current collector wire 35 and the connection part 33 and having low reactivity with the current collector wire 35 and the connection part 33.

The first current collection part 32 is an electrically conductive member and is electrically connected to the current collector wire 35 of the first electrode 31 via the connection part 33.

The second electrode 36 is a columnar body including a second active material. The second electrode 36 is a quadrilateral prism having a rectangular cross section. The secondary battery 30 may have a structure in which, for example, 50 or more second electrodes 36 are bundled together. For example, the second electrode 36 may have a capacity of 1/n the cell capacity, and n second electrodes 36 may be connected in parallel to the second current collection part 37. The outer periphery of the second electrode 36, excluding the end faces, faces the first electrode 31 with the separation membrane 41 disposed therebetween. It is preferable that the second electrode 36 be a columnar body having a length of a side of 100 μm or greater and 300 μm or less in a cross section orthogonal to the longitudinal direction. Within this range, the energy density per unit volume can be increased further. Further, within this range, the carrier ion migration distance can be reduced further, and charging and discharging can be performed with a higher current.

The second electrode 36 includes a current collector wire 38, which has a circular cross section and is embedded within the second electrode 36. It is preferable that the current collector wire 38 be formed of an electrically conductive material such as a metal, examples of which include aluminum, copper, titanium, stainless steel, nickel, iron, and platinum. The current collector wire 38 extends out of the interior, and the end portions are exposed. The length (thickness) of the current collector wire 38 in the radial direction is similar to that of the current collector wire 35.

The second current collection part 37 is an electrically conductive member and is electrically connected to the current collector wire 38 of the second electrode 36.

The separation membrane 41 is formed on the entirety of the outer peripheral surface of the first electrode 31, which faces the second electrode 36, and on the entirety of the outer peripheral surface of the second electrode 36, which faces the first electrode 31. The separation membrane 41 prevents short circuiting between the first electrode 31 and the second electrode 36.

In the secondary battery 30, since the columnar first electrode 31 and the first current collection part 32 are connected to each other by fusion bonding with a low-melting-point metal, which has a low melting point, a plurality of the first electrodes 31 can be easily connected to the first current collection part 32. For example, connection can be accomplished at low temperature, with a low force, and with a simpler configuration. Furthermore, compared with the case in which the first electrode 31 is simply in contact with the first current collection part 32, contact resistance is reduced, current can be collected more reliably, and the current collection status can be maintained to be stable. Furthermore, since the connection part 33 is formed of a low-melting-point metal, if an internal short circuit occurs, the portion of the connection part 33 between the first current collection part 32 and the portion of the first electrode 31 included in the path of the internal short circuit melts to serve as a fuse mechanism, thereby further increasing the safety of the lithium secondary battery.

Furthermore, in the secondary battery 30, since the plating layer 34 is formed between the current collector wire 35 of the first electrode 31 and the connection part 33, electrical connection between the first electrode 31 and the connection part 33 is further improved because, for example, adhesion between the current collector wire 35 of the first electrode 31 and the connection part 13 is further enhanced.

In addition, as illustrated in FIGS. 4 to 6, the secondary battery 30 has a structure in which the first electrodes 31, which are columnar bodies, and second electrodes 36, which are columnar bodies, are alternately arranged with the separation membranes 41 disposed therebetween and are bundled together. In the secondary battery 30, the electrodes are configured to have a minute columnar shape, and as such, each of the electrodes can occlude and release carrier ions through the entire periphery (see FIG. 5). In this electrode structure, carrier ions are occluded and released through the entire peripheries, and as a result, in addition to promotion of the reaction due to the increase in the positive and negative electrode facing area, the effect of improving the average reaction rate (reducing the average distance between positive and negative electrode active materials) as a result of the fact that the amount of an active material per facing area decreases as the location becomes deeper (inward location) (the ease of reaction decreases as the location of the active material becomes deeper) can be expected.

In addition, similarly to the secondary battery 10, the secondary battery 30 is a secondary battery having a further increased energy density.

Note that it is to be understood that the present disclosure is in no way limited to the embodiments described above and may be implemented in various forms within the technical scope of the present disclosure. All the features of embodiments of the present disclosure may be combined with features of other embodiments.

For example, in the embodiments described above, the secondary batteries include a plating layer, but the plating layer may be omitted. Furthermore, in the embodiments described above, the connection between the second electrode and the second current collection part is not particularly limited provided that the second electrode and the second current collection part can be electrically connected to each other, but, for example, the connection can be made via a connection part formed of a low-melting-point metal. In such a case, the second electrode may include a plating layer formed to be disposed between the second electrode and the connection part. For the connection part and the plating layer, those described above may be appropriately employed. Furthermore, in the secondary batteries described above, the first electrode is a negative electrode and the second electrode is a positive electrode. However, this is not a particular limitation, and the first electrode may be a positive electrode and the second electrode may be a negative electrode. Furthermore, in the embodiments described above, the carrier of the secondary battery is lithium ions. However, this is not a particular limitation, and the carrier may be alkaline ions, such as sodium ions or potassium ions, or Group 2 element ions, such as calcium ions or magnesium ions. Furthermore, the electrolyte solution is a non-aqueous electrolyte solution, but the electrolyte solution may be an aqueous electrolyte solution.

Figure 7:
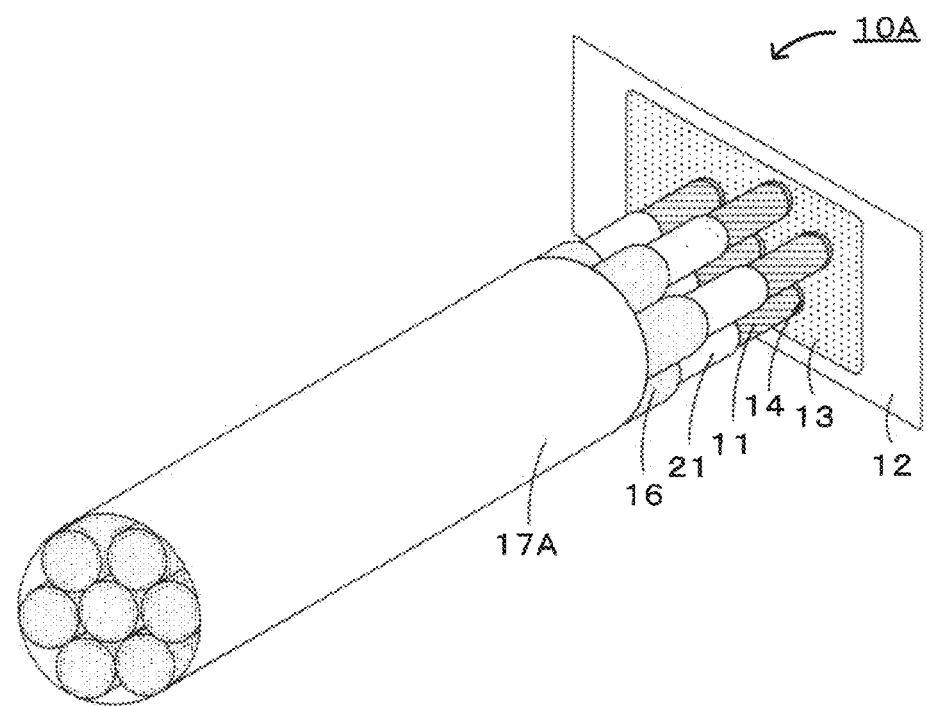
FIG. 7 is a schematic diagram illustrating an example of a secondary battery 10A.

In the secondary battery 10 described above (see FIGS. 1 and 2), the second current collection part 17 is provided adjacent to an end portion of the second electrode 16; however, as in a secondary battery 10A, illustrated in FIG. 7, a second current collection part 17A may be provided around the outer periphery of second electrodes 16 bundled together. In the secondary battery 10A, both ends of the first electrode may be exposed from the second electrode, and a first current collection part may be connected to each of the ends of the first electrode.

Figure 8:
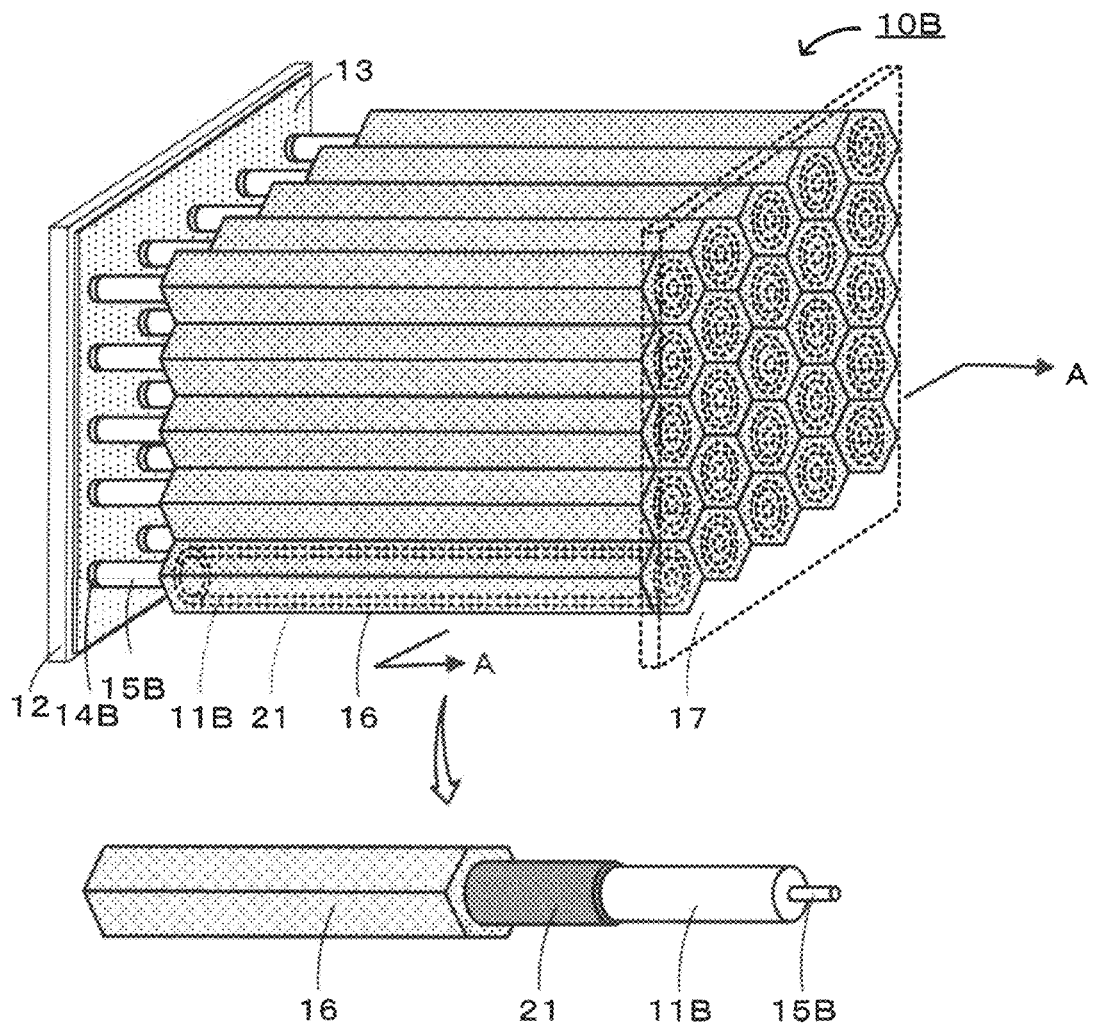
FIG. 8 is a schematic diagram illustrating an example of a secondary battery 10B.
Figure 9:
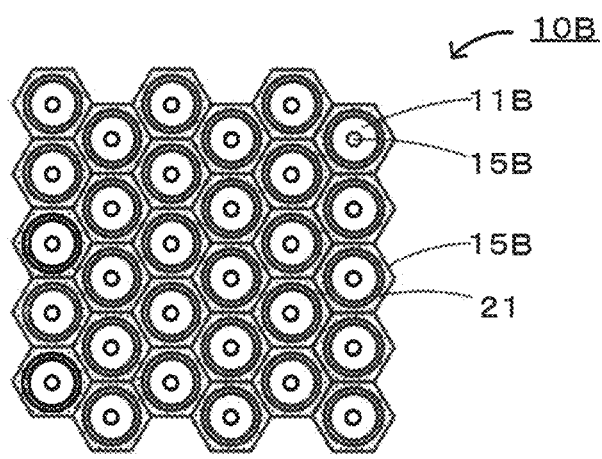
FIG. 9 is a cross-sectional view taken along line A-A of FIG. 8.

In the secondary battery 10 described above, neither the first electrode 11 nor the second electrode 16 includes a current collector wire, but this is not a particular limitation, and the first electrode 11 and the second electrode 16 may include a current collector wire embedded therein, as with the secondary battery 30. In the case where a current collection member, such as a current collector wire, is embedded in the second electrode 16, the current collection member may be embedded within each of the second electrodes 16 or may be embedded between adjacent second electrodes 16. Note that an absence of a current collector wire results in a further increase in the energy density and is therefore preferable. FIG. 8 is a schematic diagram illustrating an example of a secondary battery 10B. FIG. 9 is a cross-sectional view of the secondary battery 10B of FIG. 8 taken along line A-A. The first electrode 11B includes a current collector wire 15B, which has a circular cross section and is embedded within the first electrode 11B. The current collector wire 15B extends out of the interior, and the end portion is exposed. A connection part 13 is formed adjacent to the exposed end portion of the current collector wire 15B. Note that the current collector wire 15B may not extend out of the interior, and, for example, an end face of the current collector wire 15B may be exposed in the end face of the first electrode 11B. A plating layer 14B is formed on the surface of the current collector wire 15B, which extends beyond the first electrode 11B, to be disposed between the connection part 13 and the current collector wire 15B. For example, the diameter of the current collector wire 15B is preferably not greater than 50 μm, more preferably not greater than 40 μm, and even more preferably not greater than 30 μm. It is preferable that the current collector wire 15B be as thin as possible provided that electrical conductivity is ensured. The reason is that the energy density per unit volume can be further improved. For example, the length of the current collector wire 15B in the radial direction is preferably not less than 1 μm, more preferably not less than 5 μm, and even more preferably not less than 10 μm. From the standpoint of ensuring electrical conductivity, it is preferable that the current collector wire 15B be thick. In the secondary battery 10B, the first electrode 11B may be one obtained by, for example, forming a carbon material on the surface of the current collector wire 15B and then performing a heat treatment so that the crystallization and orientation of a graphene structure are enhanced.

The above-described method for manufacturing the secondary battery 10 (see FIG. 3) includes the heat treatment step, the separation membrane forming step, the second active material forming step, the electrically conductive material adding step, the bundling step, the plating step, the low-melting-point metal forming step, and the connecting step. However, it is sufficient that the separation membrane forming step, the bundling step, and the connecting step be included, and the other steps may be omitted or modified.

Furthermore, the order of the steps may be changed appropriately. For example, the plating step may be performed prior to the separation membrane forming step. In such a case, the plating layer is prevented from being formed on the separation membrane, and therefore the positive electrode and the negative electrode can be insulated from each other more reliably. On the other hand, if the plating step is performed after the bundling step, the end portions of all the first electrodes 11 can be plated at one time. Note that it is preferable that the connecting step be performed after the bundling step. In the case that the first electrodes are connected to the first current collection part after being bundled together, all the first electrodes can be connected to the first current collection part at one time, and therefore efficiency is high.

Figure 10F:
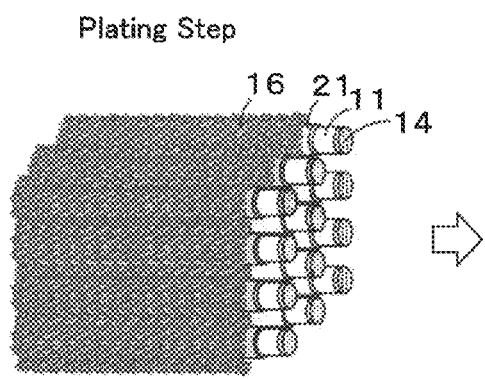
FIGS. 10F to 10H are illustrative diagrams illustrating another example of a process of manufacturing a secondary battery 10.
Figure 10G:
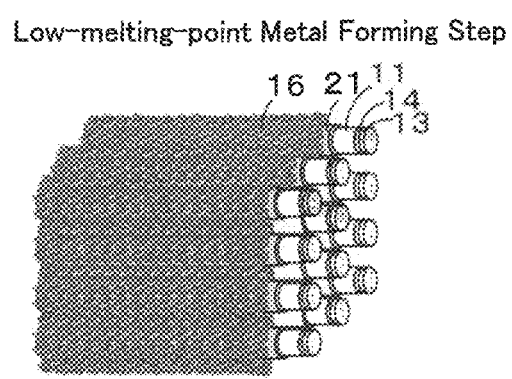
Figure 10H:
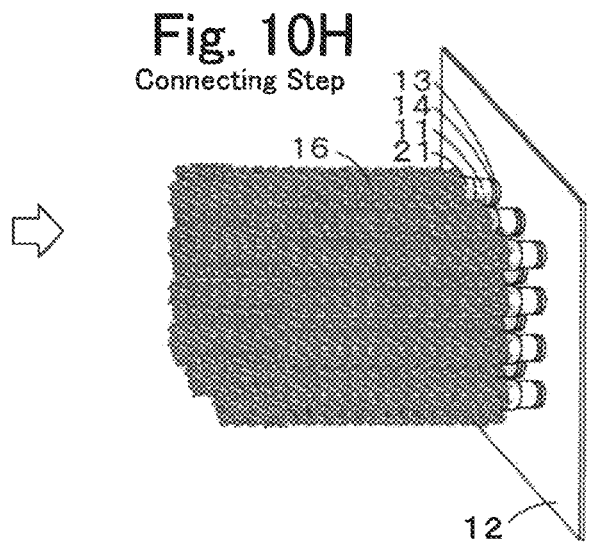

In the above-described method for manufacturing the secondary battery 10, in the low-melting-point metal forming step, the low-melting-point-metal layer is formed on the surface of the first current collection part 12. However, the low-melting-point-metal layer (connection part 13) may be formed on the surface of the first electrode 11. In such a case, the low-melting-point-metal layer may be formed on the surface of the end portion of the first electrode 11 or may be formed on the end face of the first electrode 11. Alternatively, the low-melting-point-metal layer may be formed on the surface of the plating layer 14 provided on the end portion of the first electrode 11. FIG. 10 illustrate examples of such a manufacturing method. Note that, in FIG. 10, the steps prior to the plating layer forming step are omitted because the steps are the same as those in FIG. 3. In the method of forming a low-melting-point-metal layer on the surface of the first current collection part, it is unlikely that the low-melting-point metal may stick to portions other than the end face of the first electrode, the separation membrane, the second electrode, or the like, and therefore the safety of the secondary battery can be further increased. On the other hand, in the method of forming a low-melting-point-metal layer on the surface of the first electrode 11, the connection part is formed exclusively on portions facing the first electrode on the surface of the first current collection part, and therefore current is further concentrated in the connection part, and Joule heat generated in the connection part in the case that an internal short circuit occurs within a unit cell further increases. Consequently, the unit cell experiencing an internal short circuit can be electrically disconnected from the entire cell earlier.

Figure 11:
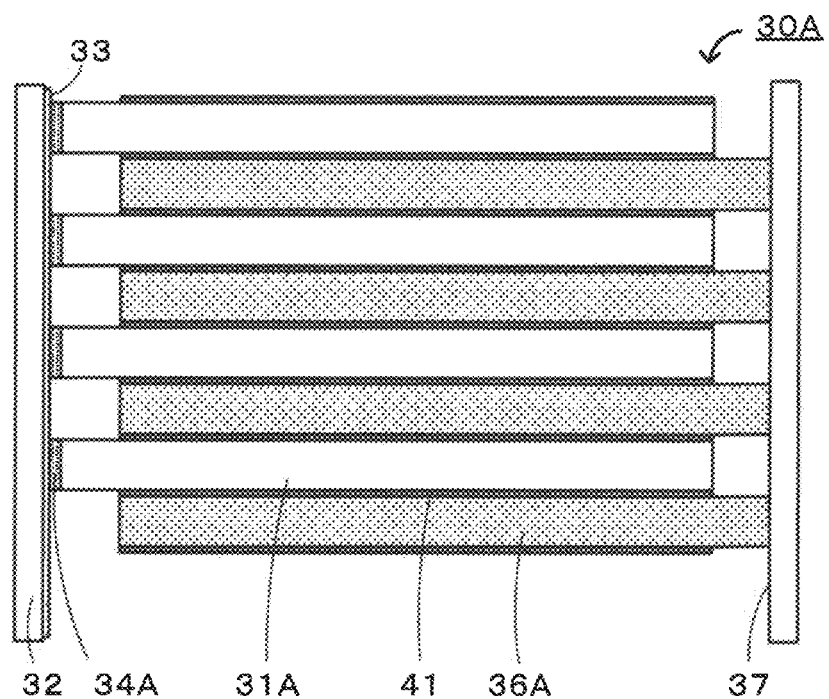
FIG. 11 is a plan view of the secondary battery 30A.

In the above description regarding the secondary battery 30 (see FIGS. 4 to 6), the first electrode 31 includes the current collector wire 35, and the second electrode 36 includes the current collector wire 38, but this is not a particular limitation, and the current collector wire may be omitted for each of the electrodes. FIG. 11 is a schematic diagram illustrating an example of a secondary battery 30A. In the secondary battery 30A, the first electrode 31A is electrically conductive itself, and the current collector wire 35 is omitted. With regard to the first electrode 31A, the columnar body itself is electrically connected to the first current collection part 32. A connection part 33, which is formed of a low-melting-point metal, is provided between the first electrode 31A and the first current collection part 32. The first electrode 31A is connected to the first current collection part 32 via the connection part 33. The plating layer 34A is formed on the surface of the first electrode 31A to be disposed between the connection part 33 and the first electrode 31A. Furthermore, the second electrode 36A is electrically conductive itself, and the current collector wire 38 is omitted. With regard to the second electrode 36A, the columnar body itself is electrically connected to the second current collection part 37. The secondary battery 30A includes no current collector wires in its internal structure and therefore has a further increased energy density.

In the above description regarding the secondary battery 30, the current collector wire 35 and the current collector wire 38 each has a circular cross section. However, this is not a particular limitation. FIG. 12 present cross-sectional views of examples of secondary batteries 30B to 30E. For example, the secondary battery 30B includes current collector foils 35B, 38B, which are diagonally disposed as viewed in a cross section of the electrodes. Furthermore, the secondary battery 30C includes current collector foils 35C, 38C, which are horizontally disposed as viewed in a cross section of the electrodes. Furthermore, the secondary battery 30D includes current collector foils 35D, 38D, which are vertically disposed as viewed in a cross section of the electrodes. Furthermore, the secondary battery 30E includes, in the interiors of the respective electrodes, current collection members, 35E, 38E, which are three-dimensional network structures (e.g., Celmet, manufactured by Sumitomo Electric Industries, Ltd. Celmet is a registered trademark). The secondary batteries 30B to 30E, described above, also have a further increased energy density because the structure in which columnar body electrodes are bundled together is employed. The secondary batteries 30, 10B, too, may include current collector foils or current collection members described above in place of the current collector wires. Furthermore, in the above description, in the case where the first and/or the second electrodes include current collector wires, current collector foils, or current collection members described above, they extend out of the interior. However, they may not extend out of the interior, and, for example, only their end faces may be exposed in the end faces of the electrodes.

EXAMPLES

Examples of the above-described secondary batteries that were specifically prepared will now be described as Examples.

Experimental Example 1

A secondary battery 30, which had the structure illustrated in FIG. 4, was prepared. First, positive electrodes and negative electrodes were prepared. Each of the positive and negative electrodes was a quadrilateral prism electrode of 30 mm length, having a side of 200 µm and including a metal current collector wire of 50 µm diameter disposed therein. The preparation was performed by extrusion molding. The positive electrode was prepared by molding a mixture in which Li (Ni, Co, Mn)O$_2$, which was used as a positive electrode active material, acetylene black, which was used as an electrically conductive material, and PVdF, which was used as a binder, were mixed at a mass ratio of 90:7:3. The negative electrode was prepared by molding a mixture in which graphite, which was used as a negative electrode active material, and PVdF, which was used as a binder, were mixed at a mass ratio of 97:3. A PVdF-HEP film was coated onto the outer peripheries of the electrodes by dip coating such that a thickness of the PVdF-HEP film of 10 µm would be obtained. Next, 50 pairs of positive and negative electrodes were arranged in a grid-like pattern and bundled together, and thus an electrode structure in which wire-form current collector wires were connected in parallel to a current collection plate was obtained. During that time, a 3 mm portion of the wire was retained to serve as a connection part. This electrode structure was placed in an Al laminate pouch and impregnated with an electrolyte solution (1M-LiPF$_6$/EC+EMC+DMC) and thereafter sealed. The resulting secondary battery was designated as Experimental Example 1.

Figure 13:
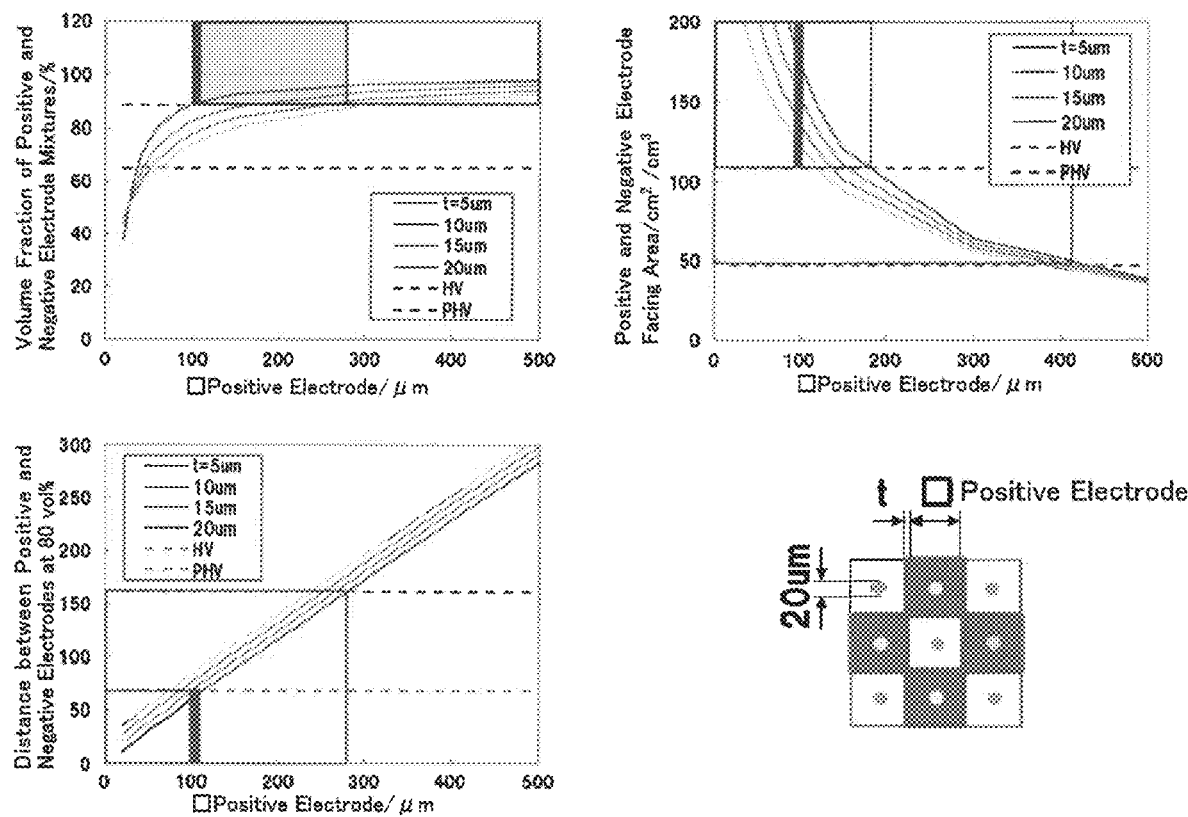
FIG. 13 is a chart illustrating the relationship between the length of a side of an electrode, the volume fraction of the positive and negative electrode mixtures, the positive and negative electrode facing area, and the distance between positive and negative electrodes at 80 vol % of the electrodes.

FIG. 13 is a chart illustrating, regarding the secondary battery 30 illustrated in FIG. 4, the relationship between the length of a side of an electrode, the volume fraction of the positive and negative electrode mixtures, the positive and negative electrode facing area, and the distance between positive and negative electrodes at 80 vol % of the electrodes, which were determined by calculation. In FIG. 13, the thickness of the separation membrane was specified to be 5 µm, 10 µm, 15 µm, and 20 for the calculation. As illustrated in FIG. 13, it was found that, when the length of a side of the electrode was within a range of 100 to 300 µm, the volume fraction was greater than 85%, the facing area was greater than 50 cm$^2$, and the distance between positive and negative electrodes was less than 150 µm, and therefore, within the range, both a high energy density and a high output can be achieved.

FIG. 14 is a chart illustrating, regarding columnar body bundled structures and electrode foil layered structures, the relationship between the volume fraction of the positive and negative electrode mixtures, the positive and negative electrode facing area, and the distance between positive and negative electrodes at 80 vol % of the electrodes, which were determined by calculation.

Calculations were performed for Experimental Examples 2 to 4 by using the lengths of sides of the positive electrode and the negative electrode, the thickness of the separation membrane, the diameter of the current collector wire, and the like illustrated in FIG. 14. Note that Comparative Example 1 is a related-art electrode structure having a layered structure and Comparative Example 2 is a model of a high-energy type electrode obtained by increasing the film thicknesses of the electrode mixtures of a related-art electrode. As illustrated in the table of FIG. 14, in each of Experimental Examples 2 to 4, the volume fraction of the positive and negative electrode mixtures in the electrode was greater than 85%, which is a value substantially equal to the value, 88.4%, of Comparative Example 2 (with a high energy density), in which the film thickness was increased. Furthermore, in each of Experimental Examples 2 to 4, the positive and negative electrode facing area was greater than the facing area, 47.3 cm$^2$, of Comparative Example 2, and therefore the structures of Experimental Examples 2 to 4 were found to be advantageous for a high output and fast charging. In addition, in each of Experimental Examples 2 to 4, the distance between positive and negative electrodes of active materials occupying 80 vol % was not greater than 120 µm (ion migration distance was shorter), and therefore the structures of Experimental Examples 2 to 4 were found to be advantageous for fast charging. It was found that these effects further increase when a side of the columnar electrode is reduced to approximately 100 µm.

FIG. 15 is a chart illustrating, regarding columnar body bundled structures of the secondary battery 10 and electrode foil layered structures, the relationship between the volume fraction of the positive and negative electrode mixtures, the positive and negative electrode facing area, and the distance between positive and negative electrodes at 80 vol % of the electrodes, which were determined by calculation. Calculations were performed for Experimental Examples 5 and 6 by using a diameter A of the negative electrode, a thickness X of the positive electrode, a thickness t of the separation membrane, and the like illustrated in FIG. 15. Note that Comparative Example 3 is a high-energy type electrode obtained by increasing the film thicknesses of the electrode mixtures of a related-art electrode and Comparative Example 4 is a model of a related-art electrode having a layered structure. Note that Reference Example 1 is an example for investigating the case in which the capacities of the positive and negative electrodes are increased compared with the related art. As illustrated in FIG. 15, it was found that, in the case that the structure of the secondary battery 10 is employed, when the diameter of the negative electrode is 20 to 50 μm and the thickness of the positive electrode is 5 to 15 μm, an energy density of the cell of 650 Wh/L or greater and a positive and negative electrode facing area of 300 cm$^2$ or greater can be obtained.

Experimental Example 7

A secondary battery 10, which had the structure illustrated in FIG. 1, was prepared. First, a highly crystalline carbon fiber of 50 μm diameter, in which a graphene structure was oriented from the center toward the outer periphery and was also oriented in the longitudinal direction, were cut into pieces of 10 cm (in the longitudinal direction of the cell) and used as a negative electrode (negative electrode active material). PVdF-HFP, which was used to form a separation membrane (electrolyte membrane), was coated by dip coating onto the outer periphery of the carbon fiber such that a thickness of the coating of 5 μm would be obtained and then dried. A positive electrode slurry was dip-coated onto the outer periphery of the carbon fiber and then dried and densified. The positive electrode slurry used was prepared by mixing Li (Ni, Co, Mn)O$_2$, which was used as a positive electrode active material, acetylene black, which was used as an electrically conductive material, and PVdF, which was used as a binder, at a mass ratio of 90:7:3 and mixing the mixture with a solvent. The amount of the positive electrode slurry coating was adjusted such that a capacity ratio between positive and negative electrodes of 1.0 would be obtained. A plurality (e.g. 50) of the carbon fibers were bundled together, the number corresponding to the cell capacity. Densification was then carried out to an extent that gaps between the bundled columnar electrodes substantially corresponded to the void fraction of the positive electrode, thereby improving the electron conductivity of the positive electrode. Next, metal was placed on end faces of the negative electrode carbon fibers and melted and fixed, and thus the carbon fibers were bonded in parallel. The resulting electrode structure was placed in an Al laminate pouch, impregnated with an electrolyte solution (1M-LiPF$_6$/EC+ EMC+DMC), and thereafter sealed. The resulting secondary battery was designated as Experimental Example 7.

Figure 16:
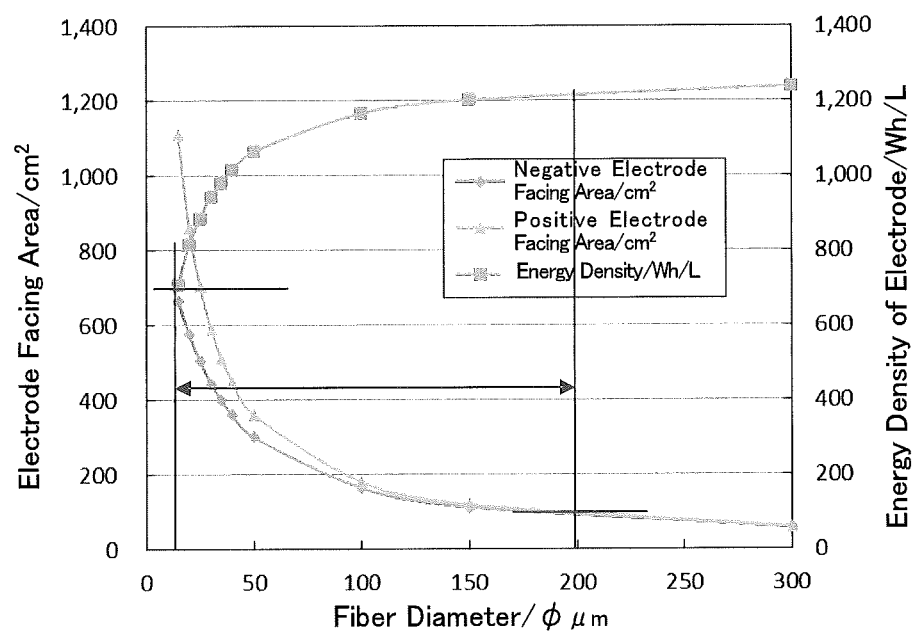
FIG. 16 is a chart illustrating the relationship between the diameter of a fibrous negative electrode active material and the electrode facing areas.
Figure 17:
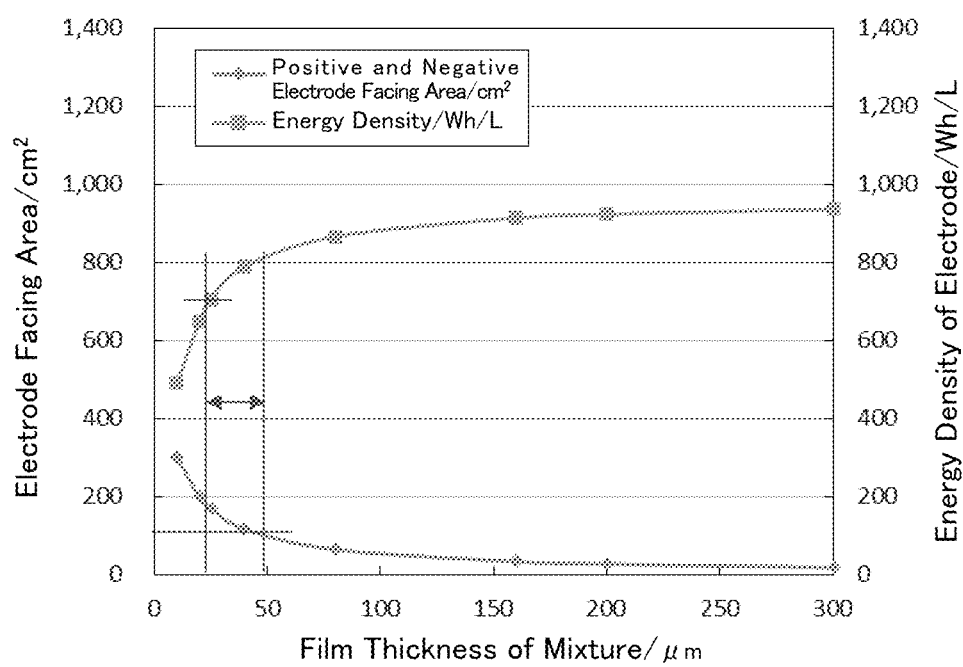
FIG. 17 is a chart illustrating, regarding a related-art structure in which current collector foils are layered, the relationship between the film thickness of the mixture and the electrode facing area.

FIG. 16 is a chart illustrating the relationship between the diameter of the fibrous negative electrode active material and the electrode facing areas. FIG. 17 is a chart illustrating, regarding a related-art structure in which current collector foils are layered, the relationship between the film thickness of the mixture and the electrode facing area. Here, the energy density of the secondary battery 10 was studied in more detail. In FIG. 16, the thickness t of the separation membrane was specified to be 5 μm, and the electrode facing areas and the energy density were determined by calculation for various fiber diameters of the negative electrode active material. In FIG. 17, for the calculation, the thickness t of the separation membrane was specified to be 5 μm, a thickness B of the positive electrode current collector foil was specified to be 12 μm, and a thickness D of the negative electrode current collector foil was specified to be 10 μm. As illustrated in FIG. 16, it was found that, when the fiber diameter is within a range of 10 μm or greater and 200 μm or less, the electrode facing areas is 100 cm$^2$ or greater, that is, the area through which the carrier ions migrate in and out increases, and a high energy density, namely, an energy density of 700 Wh/L or greater can be achieved. Furthermore, it was found that the secondary battery 10 exhibits 1210 Wh/L at a maximum. On the other hand, as illustrated in FIG. 17, it was found that, with the related-art layered structure, the film thickness of the mixture for obtaining an electrode facing area of 100 cm$^2$ or greater and an energy density of 700 Wh/L or greater was 25 to 50 μm, and the energy density was 810 Wh/L at a maximum, which indicates that obtaining a high energy density is difficult.

As described above, the electrode structures of the experimental examples make it possible to achieve a high output, fast charging properties, and a high level of safety while improving the energy density to 600 Wh/L (electrode mixture volume fraction of approximately 88%), which is suitable for electric vehicles, by using a positive electrode active material, a negative electrode active material, and an organic electrolyte solution used for Li batteries.

Example 1

A secondary battery 10A as illustrated in FIG. 7 was prepared. A carbon rod (carbon material primarily including graphite) of 0.38 to 0.39 mm φ was provided as the negative electrode. A copper plating was applied to an end portion of the carbon rod, and a nickel plating was further applied. Next, the side surface of the carbon rod was covered with a coating of polyvinylidene fluoride (PVdF), and this was coated with a positive electrode mixture containing a positive electrode active material (LiCoO$_2$) to prepare a unit cell. Subsequently, a plurality of the unit cells were bundled together by swaging an aluminum tube, which served as a positive electrode current collector, onto the plurality of the unit cells. End portions (plated) of the bundled carbon rods were brought into contact with a low-melting-point metal (U-ALLOY, U-138), which was applied in advance to a negative electrode current collector made of a copper plate, and heated. Thus, the carbon rods were fusion-bonded to the negative electrode current collector with the low-melting-point metal. The resulting electrode structure was placed in a battery container, an electrolyte solution (LiPF$_6$/EC+ DMC) was dripped into the container in an inert atmosphere, and the container was sealed. Thus, a secondary battery of Example 1 was prepared. A portion of the electrolyte solution causes the PVdF coating to swell to form a separation membrane (electrolyte membrane). This secondary battery was chargeable and dischargeable.

Example 2

Figure 18:
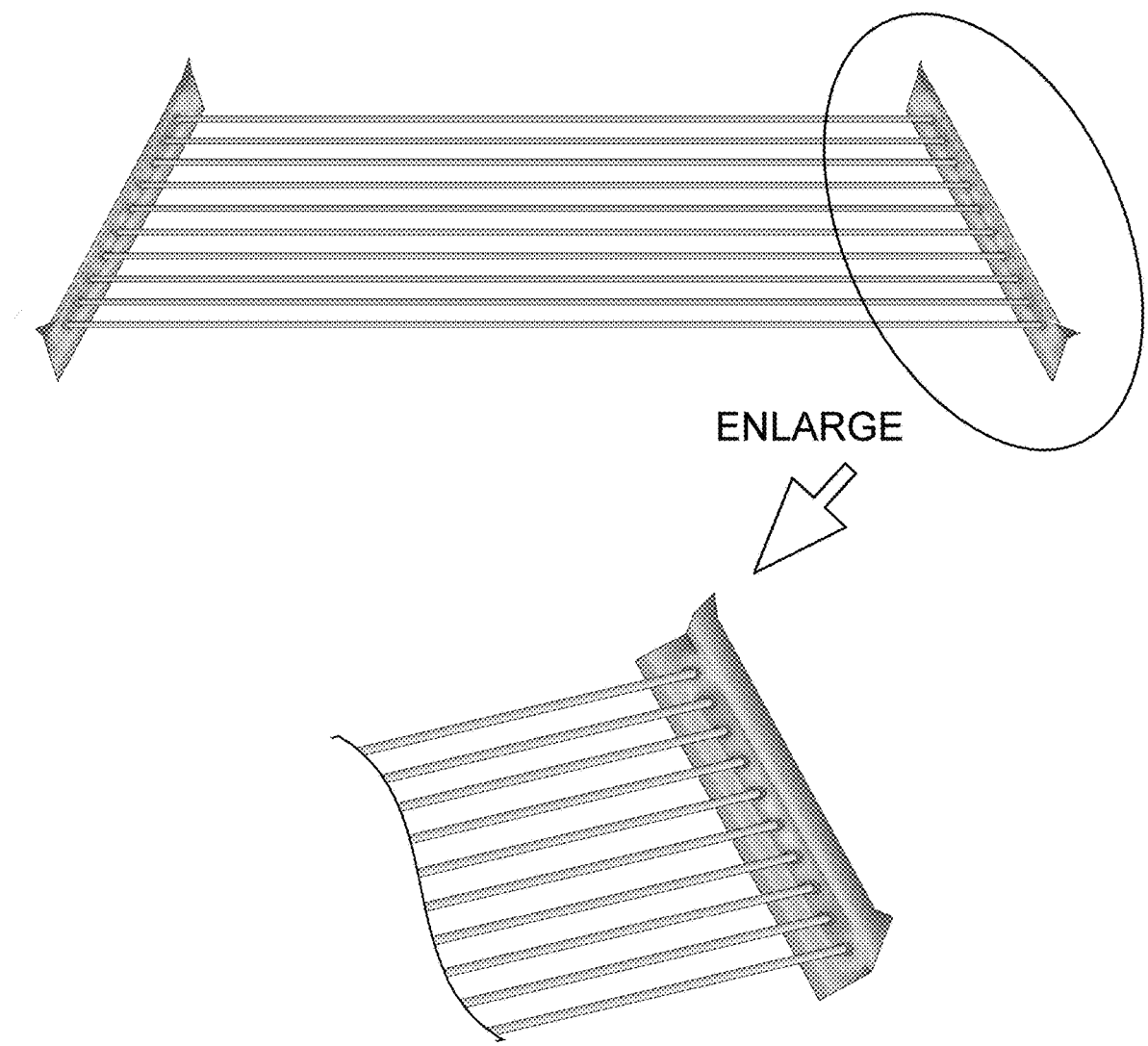
FIG. 18 is a photograph of a connection part of Example 2.

End portions of carbon rods, which had the same specifications as the carbon rods used in Example 1, were plated with a metal as in Example 1 and then fusion-bonded to a negative electrode current collector with a low-melting-point metal. Thus, the carbon rods and the negative electrode current collector were connected to each other (see FIG. 18). The carbon rods and the negative electrode current collector were connected to each other relatively easily, with none of the carbon rods being broken during connection. The resistance between terminals of the carbon rod and the negative electrode current collector was measured with a digital multimeter, and the resistance between terminals was measured to be approximately 280 mΩ.

Comparative Example 6

Figure 19:
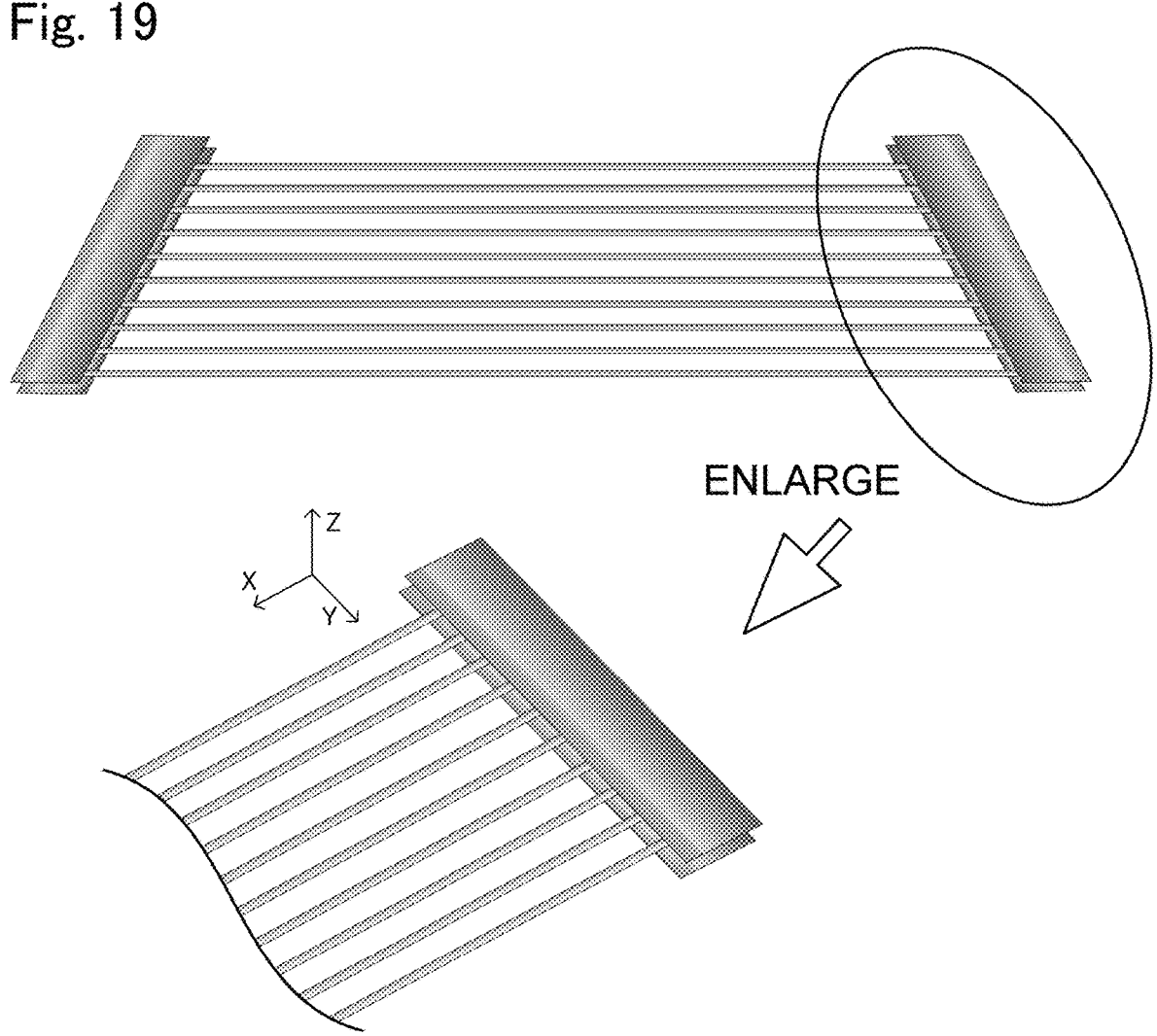
FIG. 19 is a photograph of a connection part of Comparative Example 6.

A negative electrode current collector was placed at end portions of carbon rods, which had the same specifications as the carbon rods used in Example 1, and the negative electrode current collector was secured with a clip. Thus, the carbon rods and the negative electrode current collector were connected to each other (see FIG. 19). During securement of the negative electrode current collector with the clip, some of the carbon rods were broken under pressure of the clip. The resistance between terminals was measured in a manner similar to that for Example 2, and the resistance between terminals was measured to be approximately 450 mΩ.

Experimental Results and Studies

Example 2 and Comparative Example 6 indicate that, when carbon rods (first electrode) are connected to a negative electrode current collector (first current collection part) with a low-melting-point metal as in Example 2, the carbon rods and the negative electrode current collector can be connected to each other easily, and the contact resistance between the carbon rods and the negative electrode current collector is low and therefore current can be collected more favorably. Furthermore, in Example 2, in which a plating layer was provided, the connection between the carbon rods and the negative electrode current collector was stronger than in the case in which no plating layer was provided. Even when, as in Comparative Example 6, the end portions of the bundle of the carbon rods were held with a metal current collector and pressure was applied, an electrical contact was formed between the carbon rods and the metal current collector. However, carbon rods were broken in some cases, and the contact resistance was high. When the contact resistance is high, current collection becomes insufficient, and the battery is unstable. In Comparative Example 6, one way to reduce the contact resistance may be to increase the contact area of the carbon rods and the negative electrode current collector, but, in such a case, it is necessary to increase the proportion of the space occupied by the negative electrode current collector in the entire cell by, for example, extending the negative electrode current collector in the X direction of FIG. 19, which results in a decrease in the energy density of the entire cell.

Furthermore, in Comparative Example 6, another way to reduce the contact resistance may be to firmly press the negative electrode current collector against the carbon rods, but, in such a case, carbon rods are broken more frequently. Furthermore, in modes in which carbon rods are connected to a negative electrode current collector by application of pressure as in Comparative Example 6, if pressure is applied to carbon rods in the X direction of FIG. 19, the carbon rods particularly tend to be broken, and it is therefore difficult to form a sufficient electrical contact by bringing a negative electrode current collector into contact with the end faces of the carbon rods. Accordingly, in the case where columnar electrodes are arranged in rows in the Y direction as in Comparative Example 6, some degree of electrical contact was formed between all of the carbon rods and the negative electrode current collector, but, if additional rows are overlaid in the Z direction, it is difficult to form an electrical contact between all of the carbon rods and the negative electrode current collector. Thus, it was found that, by connecting the carbon rods to the negative electrode current collector with a low-melting-point metal, the carbon rods and the negative electrode current collector can be easily connected to each other by application of pressure, and current can be collected more favorably.

Note that it is to be understood that the present disclosure is in no way limited to the examples described above and may be implemented in various forms within the technical scope of the present disclosure.

For example, the process for preparing each of the electrodes is not limited, and the shape of each of the electrodes is not limited to a quadrilateral prism and may be a cylinder or a hexagonal prism. The current collection member is not limited to a current collector wire and may be a foam metal or the like. The separation membrane covering the electrode is not limited to a polymer electrolyte membrane and may be a membrane of a solid electrolyte (oxide or sulfide), a gel polymer electrolyte, or an intrinsic polymer electrolyte (e.g., PEO). The electrolyte solution is not limited to a $LiPF_6$ electrolyte solution, which is used in Li batteries, and may be an aqueous electrolyte solution, a concentrated organic electrolyte solution, a non-flammable organic electrolyte solution in which a non-flammable solvent is used as the solvent, or a solid electrolyte (all-solid-state battery).

This specification refers to Japanese Patent Application No. 2018-072695, filed in Japan on Apr. 4, 2018, the disclosure of which, including the specification, the drawings and the claims, is incorporated herein in its entirety.

What is claimed is:

1. A secondary battery comprising:
a plurality of first electrodes, each first electrode being a columnar body including a first active material;
a first current collection part connected to the plurality of first electrodes;
a second electrode that is a molded body containing a second active material; and
a plurality of separation membranes, each separation membrane having ionic conductivity and insulating each first electrode from the second electrode, wherein
the plurality of the first electrodes are bundled together, with each of the first electrodes being adjacent to the second electrode with each respective separation membrane disposed therebetween, and
the plurality of the first electrodes is connected to the first current collection part via a connection part formed of a low-melting-point metal having a melting point of 327.5° C. or lower, wherein
the connection part is formed between the first current collection part and an end face of each of the first electrodes, the end face contacting the first current collection part via the connection part,
the connection part is disposed on a surface of the first current collection part at portions of the surface facing the plurality of first electrodes and at portions of the surface that do not face the plurality of first electrodes, and
the second electrode is formed of an active material layer including the second active material, the active material layer encompassing each first electrode.

2. The secondary battery according to claim 1, wherein the low-melting-point metal has a melting point of 232° C. or lower.

3. The secondary battery according to claim 1, wherein the low-melting-point metal includes at least one of tin, bismuth, and indium.

4. The secondary battery according to claim 1, wherein the first electrode includes a plating layer formed thereon, the plating layer being disposed between the first electrode and the connection part and including a material different from a material of the connection part.

5. The secondary battery according to claim 4, wherein the plating layer includes at least one of a copper plating layer and a nickel plating layer.

6. The secondary battery according to claim 1, wherein the first electrode is a prismatic body having a length of a side of 10 μm or greater and 300 μm or less or a cylindrical body having a length in a radial direction of 10 μm or greater and 300 μm or less.

7. The secondary battery according to claim 1, wherein 50 or more of the first electrodes are connected in parallel to the first current collection part.

8. The secondary battery according to claim 1, wherein each first electrode is a columnar body formed of a carbonaceous material.

9. A method for manufacturing a secondary battery, the method comprising:
- a separation membrane forming step of forming, on a surface of each of a plurality of first electrodes, a separation membrane having ionic conductivity and an insulating property, each first electrode being a columnar body including a first active material;
- a bundling step of bundling together the plurality of the first electrodes, each of the first electrodes being adjacent to a second electrode with the separation membrane disposed therebetween, the second electrode being a molded body containing a second active material; and
- a connecting step of connecting the plurality of the first electrodes to a first current collection part via a connection part formed of a low-melting-point metal having a melting point of 327.5° C. or lower, wherein the connection part is formed between the first current collection part and an end face of each of the first electrodes, the end face contacting the first current collection part via the connection part, the connection part is disposed on a surface of the first current collection part at portions of the surface facing the plurality of first electrodes and at portions of the surface that do not face the plurality of first electrodes, and the second electrode is formed of an active material layer including the second active material, the active material layer encompassing each first electrode.

10. The method for manufacturing a secondary battery according to claim 9, the method further comprising a plating step of, prior to the connecting step, forming a plating layer on the first electrode, the plating layer including a material different from a material of the connection part.

11. The secondary battery according to claim 1, further comprising
- a second current collection part connected to the second electrode, wherein the first current collection part is disposed at a first end of the secondary battery, and the second current collection part is disposed at a second, opposite end of the secondary battery.

* * * * *